US012566975B1

(12) United States Patent
Teyssier et al.

(10) Patent No.: US 12,566,975 B1
(45) Date of Patent: Mar. 3, 2026

(54) SYSTEMS AND METHODS FOR CREATING A KNOWLEDGE GRAPH

(71) Applicant: Scryer, Inc., New York, NY (US)

(72) Inventors: Maureen Teyssier, Hawthorne, NJ (US); Romaine Christopher Martin, III, Houston, TX (US); Daniel Malinow, Brooklyn, NY (US); Carlos Espino Garcia, New York, NY (US); Mehdi Berrada Mnimene, New York, NY (US); Liang Li, Norfolk, VA (US)

(73) Assignee: Scryer, Inc., New York, NY (US)

( * ) Notice: Subject to any disclaimer, the term of this patent is extended or adjusted under 35 U.S.C. 154(b) by 1113 days.

(21) Appl. No.: 17/384,563

(22) Filed: Jul. 23, 2021

Related U.S. Application Data

(60) Provisional application No. 63/056,520, filed on Jul. 24, 2020.

(51) Int. Cl.
*G06N 5/022* (2023.01)
*G06N 20/00* (2019.01)

(52) U.S. Cl.
CPC ............. *G06N 5/022* (2013.01); *G06N 20/00* (2019.01)

(58) Field of Classification Search
CPC ........... G06N 5/022; G06N 5/02; G06N 20/00
See application file for complete search history.

(56) References Cited

U.S. PATENT DOCUMENTS

| | | | | |
|---|---|---|---|---|
| 12,014,288 | B1 * | 6/2024 | Abeloos | G06N 5/04 |
| 2015/0254329 | A1 * | 9/2015 | Agarwal | G06F 16/215 707/616 |
| 2020/0097601 | A1 * | 3/2020 | Han | G06F 16/36 |
| 2020/0257731 | A1 * | 8/2020 | Srinivas | G06N 20/10 |

OTHER PUBLICATIONS

Chen, Ling, et al. "AHAB: aligning heterogeneous knowledge bases via iterative blocking." Information Processing & Management 56.1 (2019): 1-13. (Year: 2019).*

(Continued)

*Primary Examiner* — Andrew T Chiusano
(74) *Attorney, Agent, or Firm* — Chamberlain, Hrdlicka, White, Williams & Aughtry; Aly Z. Dossa

(57) ABSTRACT

Systems, methods, and a computer readable storage medium for producing a knowledge graph are disclosed. The method includes resolving one or more vertices from one or more record sources on a graph where each vertex of the one or more vertices represents one or more records that contain information about an entity. The resolving of the one or more vertices includes reducing a possible number of records that are represented by each of the one or more vertices with a function and processing, by a distributed compute system, the reduced possible number of records with a machine learning algorithm. The method includes resolving one or more edges that comprise a connection between two vertices. The resolving of the one or more edges includes reducing a possible number of edges that are connected to each vertex with a function and processing, by the distributed compute system, the reduced possible number of edges with a machine learning algorithm.

13 Claims, 17 Drawing Sheets

(56) References Cited

OTHER PUBLICATIONS

Subagdja, Budhitama, et al. "Machine Learning for Refining Knowledge Graphs: A Survey." ACM Computing Surveys 56.6 (2024): 1-38. (Year: 2024).*
Hofer, Marvin, et al. "Construction of Knowledge Graphs: Current State and Challenges." Information 15.8 (2024): 509. (Year: 2024).*
Kejriwal, Mayank. Domain-specific knowledge graph construction. Cham: Springer International Publishing, 2019. (Year: 2019).*
Michelson, Matthew, and Craig A. Knoblock. "Learning blocking schemes for record linkage." AAAI. vol. 6. 2006. (Year: 2006).*
Nickel, Maximilian, et al. "A review of relational machine learning for knowledge graphs." Proceedings of the IEEE 104.1 (2015): 11-33. (Year: 2015).*
Wang, Quan, et al. "Knowledge graph embedding: A survey of approaches and applications." IEEE transactions on knowledge and data engineering 29.12 (2017): 2724-2743. (Year: 2017).*

* cited by examiner

800

805

805

SYSTEMS AND METHODS FOR CREATING A KNOWLEDGE GRAPH

CROSS REFERENCES TO RELATED APPLICATIONS

This application claims the benefit of U.S. Provisional Patent Application. No. 63/056,520 entitled as "SYSTEMS AND METHODS FOR CREATING A KNOWLEDGE GRAPH", filed Jul. 24, 2020, which is incorporated by reference in its entirety.

FIELD OF THE INVENTION

This disclosure relates to the field of data collection and processing for properties, organizations, and individuals.

BACKGROUND

A knowledge graph is an ontological structure, filled with data. An ontology captures the data structures that make up a domain of knowledge. The knowledge graph aggregates data onto entities represented as vertices in a graph structure, and also by capturing the many contextual relationships within the ontological domain. By using a knowledge graph, you remove data from the original context of many data sources and represent them in a new context with new connections, making it possible to create products that have not been possible before. However, the usefulness of the knowledge graph is limited by the difficulty of creating it. Knowledge graphs may be painstakingly created by hand. Automated systems may be limited or incapable of discerning entities of various data types and connecting them. Large scale knowledge graphs are not practical to create because of the time and resources needed to create them. However, there is a need for large scale knowledge graphs because there are a great many databases that contain various records regarding people, property, and organizations. The ability to store data in digital form has led to an explosion of more records and more stored information. Further, various records that refer to the same entity may not be obviously so. Data sources often contain information errors: Names are often misspelled, abbreviated or changed. Location information often contains a multitude of errors. There are no complete sources that contain all of the relationships between companies. Information from records might be incomplete or only partially correct. There is a need to simplify the analysis of this plethora of data with a large scale knowledge graph that is not prohibitively expensive to create.

SUMMARY

The current invention is designed to organize data in commercial real estate. Commercial real estate is property that is used to generate profit or income. Examples of commercial real estate include, but are not limited to retail buildings, entertainment venues, warehouses, and office buildings. A general aspect of the current invention includes a method for producing a knowledge graph. The method of entity and edge creation includes a function that identifies 1 or more records from 1 or more data sources, which potentially contains information about one entity, or may contain information for an edge to connect entities. The objective of this function is to reduce the possible number of grouped records. The function may be an adaptive blocking algorithm. The data is processed by a distributed compute system. Information from the reduced number of grouped records is then fed into a machine learning algorithm to either create an edge between entities or to aggregate the identified records onto an entity. The machine learning algorithm also supplies a likelihood that the information has been correctly identified and attributed to the knowledge graph in the correct structure. Methods to reduce the volume of potential record groups are tailored for each entity type or edge type. Machine learning algorithms are likewise tailored for the components of the knowledge graph that they are used to construct.

The method includes resolving one or more vertices from one or more record sources on a graph where each vertex of the one or more vertices represents one or more records that contain information about an entity. The resolving of the one or more vertices includes collecting relevant information fields pertaining to an entity type from the one or more record sources. The resolving of the one or more vertices includes reducing a possible number of records that are represented by each of the one or more vertices with a function and processing, by a distributed compute system, the reduced possible number of records with a machine learning algorithm. The method includes resolving one or more edges that comprise a connection between two vertices. The resolving of the one or more edges includes reducing a possible number of edges that are connected to each vertex with a function and processing, by the distributed compute system, the reduced possible number of edges with a machine learning algorithm. Each entity may represent an entity type that is at least one of: individuals, organizations, or property where processing, the reduced possible number of records by the distributed compute system, is performed with a machine learning algorithm that is unique to the entity type. Each edge may represent an edge type that is based on the vertices for which the edge is connected. Processing, the reduced possible number of edges by the distributed compute system, may be performed with a machine learning algorithm that is unique to the edge type. The function for reducing the possible number of records may be an adaptive blocking algorithm where the adaptive blocking algorithm is iterated over until the possible number of records is reduced below a set value. The function for reducing the possible number of edges may be an adaptive blocking algorithm where the adaptive blocking algorithm is iterated over until the possible number of edges is reduced below a set value. The machine learning algorithm may generate a score that represents a degree of confidence in a resolution of the vertex. The machine learning algorithm may generate a score that represents a degree of confidence in a resolution of the edge. The method may further include identifying duplicate vertices based on resolved vertices and resolved edges.

Another general aspect is a computing system for producing a knowledge graph. The computing system includes a processing server configured to resolve, with a vertex resolving method, one or more vertices from one or more record sources on a graph where each vertex of the one or more vertices represents one or more records that contain information about an entity. The vertex resolving method includes reducing a possible number of records that are represented by each of the one or more vertices with a function and processing, by a distributed compute system, the reduced possible number of records with a machine learning algorithm. The processing server is configured to resolve, with an edge resolving method, one or more edges that comprise a connection between two vertices. The edge resolving method includes reducing a possible number of edges that are connected to each vertex with a function and processing, by a distributed compute system, the reduced possible number of edges with a machine learning algorithm. Each entity may represent an entity type that is at least one of: individuals, organizations, or property where processing, the reduced possible number of records by the distributed compute system, is performed with a machine learning algorithm that is unique to the entity type. Each edge may represent an edge type that is based on the vertices for which the edge is connected. Processing, the reduced possible number of edges by the distributed compute system may be performed with a machine learning algorithm that is unique to the edge type. The function for reducing the possible number of records may be an adaptive blocking algorithm where the adaptive blocking algorithm is iterated over until the possible number of records is reduced below a set value. The function for reducing the possible number of edges may be an adaptive blocking algorithm where the adaptive blocking algorithm is iterated over until the possible number of edges is reduced below a set value. The machine learning algorithm may generate a score that represents a degree of confidence in a resolution of the vertex. The machine learning algorithm may generate a score that represents a degree of confidence in a resolution of the edge. The processing server may be further configured to resolve, with a resolution correction method, vertices that were under-resolved by the vertex resolving method.

Another general aspect is a method for producing a knowledge graph. The method includes resolving one or more vertices from one or more record sources on a graph where each vertex of the one or more vertices represents one or more records that contain information about an entity. The resolving of the one or more vertices includes reducing a possible number of records that are represented by each of the one or more vertices with a function and processing, by a distributed compute system, the reduced possible number of records with a machine learning algorithm. The method includes resolving one or more edges that comprise a connection between two vertices. The resolving of the one or more edges includes reducing a possible number of edges that are connected to each vertex with a function and processing, by the distributed compute system, the reduced possible number of edges with a machine learning algorithm. The function for reducing the possible number of records may be an adaptive blocking algorithm where the adaptive blocking algorithm applies one or more rules to the possible number of records. The adaptive blocking algorithm may be iterated over until the possible number of records is reduced below a set value. The rules for the adaptive blocking algorithm may be determined by a machine learning algorithm. The function for reducing the possible number of edges connected to each vertex may be an adaptive blocking algorithm where the adaptive blocking algorithm applies one or more rules to the possible number of edges for each vertex and the adaptive blocking algorithm is iterated over until the possible number of edges for each vertex is reduced below a set value. The rules for the adaptive blocking algorithm may be determined by a machine learning algorithm. The method may further include identifying duplicate vertices based on resolved vertices and resolved edges. Each edge may represent an edge type that is based on the vertices for which the edge is connected where processing, the reduced possible number of edges by the distributed compute system is performed with a machine learning algorithm that is unique to the edge type.

DETAILED DESCRIPTION

A knowledge graph may be implemented to efficiently organize large and complex data into a format of interconnected entities. In an exemplary embodiment, a knowledge graph is used to display real property on a map with connections to individuals and companies. One may select entities that represent properties at their geographic locations on a map to open records that identify individuals and companies that have had legal interests in the property. The property may have connections to other properties based on records associated with the property.

An exemplary embodiment of the disclosed subject matter is a process for treating one or more sets of data, with a multitude of records, to resolve entities that are incorporated within the one or more sets of data. A function that eliminates unrelated records may be employed to decrease the number of possible records that correspond to each entity. After the number of possible records is reduced, the remaining records may be processed by a learned algorithm to fully resolve the entities. In one example, entities are resolved by determining associations of data between entities.

Once the entities are resolved, various connections between entities are determined to resolve an edge, if any, between entities. All pairs of entities may be regarded as having possible edges. An algorithm may be used to reduce the number of possible connections by eliminating pairs of entities. In various embodiments, a blocking algorithm assembles pairs into blocks based on parameters of the pairs of entities. Possible pairs that are not within the same block are not considered. In one example, the algorithm is an adaptive blocking algorithm.

After reducing the number of pairs of entities to a manageable number, the remaining pairs of entities may be evaluated to determine connections between the entities. An example of a connection is a legal interest between entities. In one instance, an individual entity that was the owner of a property entity may be connected to the property entity. The property entity may be connected to multiple owners based on the criteria for the knowledge graph.

Various types of entities may be resolved by the process for producing a knowledge graph. In various embodiments, the entities may be individuals, organizations, families, teams, corporations, charities, properties, localities, governments, mortgage events, sales events, or the like. Entities may be connected in various ways such as through ownership interest, contracts, employment, lawsuits or other disputes, legal jurisdiction, and the like.

Figure 1:
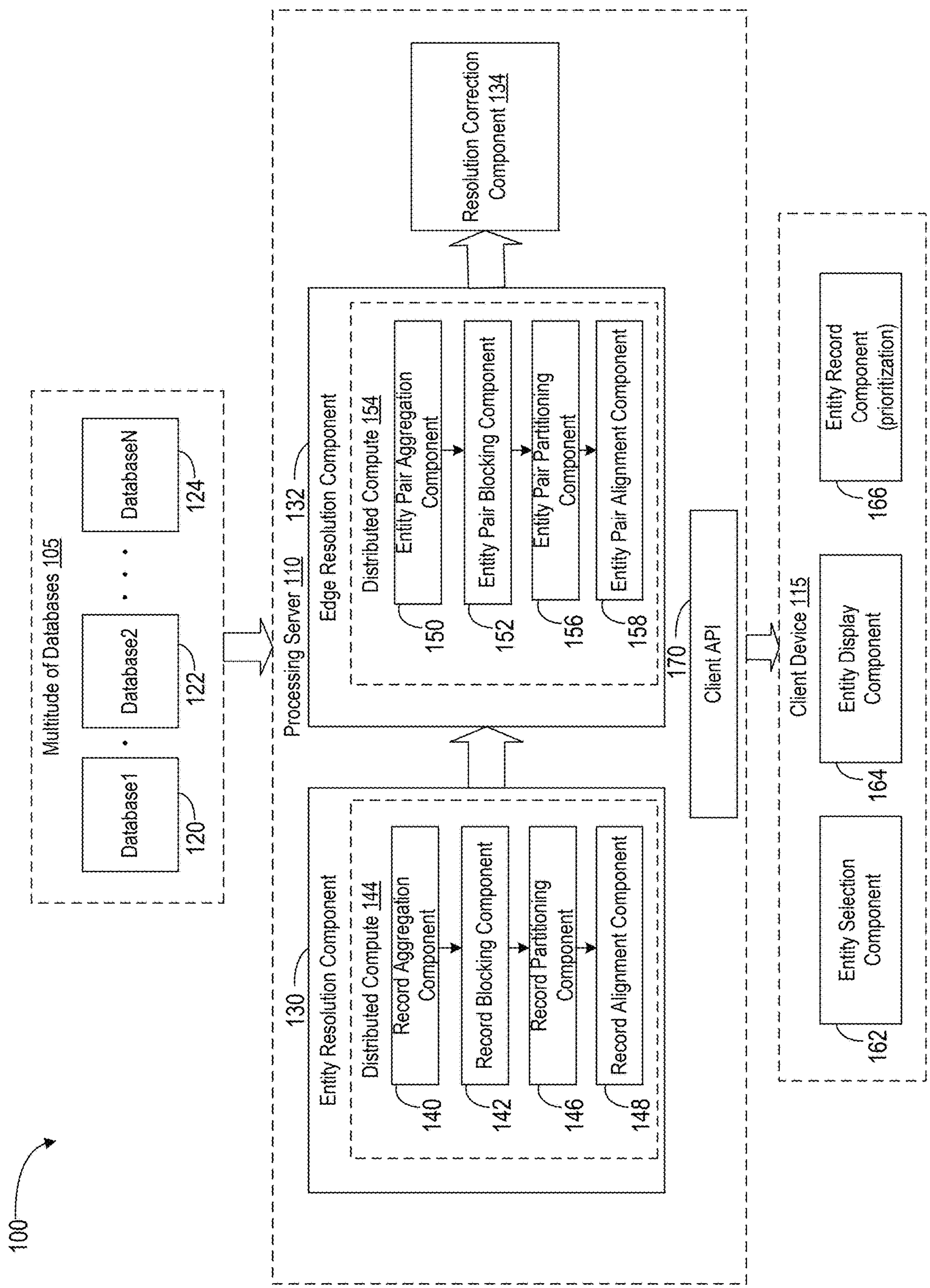
FIG. 1 illustrates an exemplary embodiment of the disclosed subject matter.

Referring to FIG. 1, FIG. 1 is a schematic illustrating the system 100 that may be used to create a knowledge graph. The system 100 may be used to organize data into various entities that are connected by edges that represent associations between the entities. A description of an entity may include the data of connected entities, which are often known as attributes. In various embodiments, the system includes a processing server 110 that can resolve entities from data in a multitude of databases 105. The processing server 110 may further resolve edges between the entities. In various embodiments, the processing server 110 may present the knowledge graph in various formats to a client device 115.

In the embodiment shown in FIG. 1, the system 100 includes a multitude of databases 105, a processing server 110, and a client device 115. The multitude of databases 105 may include various collections of records. The collections of records may be in various formats and may cover various types of information. For example, a Database1 120 may include data relating to property records while a Database2 122 may include data related to corporate records. The multitude of databases 105 may comprise a large number of databases whereby DatabaseN 124 represents the last database of the total number of the multitude of databases 105.

The processing server 110 may process each of the multitude of databases 105 to incorporate them into a knowledge graph. The processing server 110 may be a computer system with a processer, memory, and storage. The processing server 110 may be a single computer system, a distributed computing system, a cloud computing system, or the like. The processing server 110 may inspect records in the multitude of databases 105 to resolve entities from the records. An entity may be an individual, a property, an organization, or the like. The entities, once they are resolved by the processing server, may be linked through associations between the entities. An association between the entities may be any recorded connection of one entity to another entity. For example, an entity that represents an individual may be connected to an entity that represents property that was owned at one time by the individual. The same entity that represents the individual may be connected to another entity that represents a corporation for which the individual owned a controlling interest. The corporate entity may be connected to various other entities if the records in the multitude of databases 105 so indicate.

The processing server 110 may include an entity resolution component 130 and an edge resolution component 132. The entity resolution component 130 may resolve entities from records that are stored in the multitude of databases 105. Entities may be resolved with various methods that determine whether various records and data refer to the same entity. The various records may refer to the same names, phone numbers, addresses, emails, urls, geographic areas, or industry descriptions. Functions may be used to determine whether names that are close, but not the same, refer to the same entities. In an exemplary embodiment, entities are resolved with name resolution algorithms. Examples of name resolution or industry description algorithms include, but are not limited to: string similarity, the Jaro-Winkler algorithm, Levenshtein distance, and word2vec skip-gram, Multi-Sense Skip-Gram (MSSG). A function that automatically abbreviates names may be incorporated into the name resolution algorithm. A degree to which records refer to the same entity may be represented by a confidence score, which may be determined by a machine learned algorithm. The confidence score may be incorporated into the entity or connections between entities. Records that are similar beyond a threshold may be determined to refer to the same entity. In various embodiments, the records that belong to an entity may be ordered according to their confidence score. In an exemplary embodiment, the records that belong to an entity may be included or ordered according to other criteria such as date of relevance where a more recent record date may be ordered ahead of older dates.

The entity resolution component 130 may include a record aggregation component 140, a record blocking component 142, a record partitioning component 146, and a record alignment component 148. The record aggregation component 140 may collect data and records from the multitude of databases 105 such that the records and data may be analyzed by the processing server 110. The record aggregation component 140 may convert various records into a similar format so that they may be processed together. Where records from a database with the multitude of databases 105 are in paper or image form, the record aggregation component 140 may convert images of paper or image records into digital records with digitized text to be analyzed.

As the number of records in the multitude of databases increases, the amount of computing to analyze possible similarities between records may grow exponentially as each of the records may need to be checked against the other records. To reduce the possible combinations of records that refer to the same entities, a blocking algorithm may be employed to isolate records within blocks. Various functions may be used to isolate the blocks. For example, records that refer to addresses or jurisdictions within a geographic area may be blocked such that the records may only be analyzed against similar such records.

Adaptive blocking may be used by the record blocking component 142 to produce possible matching records for entities. Adaptive blocking algorithms determine the optimum rules to be used in the blocking function. A rule may compare or sort data according to a specific criterion. For example, a rule may compare the first two letters of a last name or compare a date. Multiple rules may be used together as part of the blocking function. Examples of adaptive blocking approaches are described by Michelson and Knoblock *In Proceedings of the* 21*st National Conference on Artificial Intelligence* (*AAAI*-06), Boston, MA, 2006; Winkler, W. E. 2005. Approximate string comparator search strategies for very large administrative lists Technical report Statistical Research Report Series (Statistics 2005-02) U.S. Census Bureau; and Bilenko *Proceedings of the 6th IEEE International Conference on Data Mining* (*ICDM*-2006). The rules for the optimal blocking algorithm may be learned using a machine learning algorithm that is supervised or unsupervised.

Once blocks have been created by the record blocking component 142, the records may be analyzed more systematically with other records within the same blocks. Because of increased computational needs to analyze the records, a distributed compute 144 system may be used to efficiently break up and process the records to resolve entities. The distributed compute 144 system may comprise one or more CPU systems, GPU systems, FPGA systems, or the like. The distributed compute 144 system may share a single storage among its distributed processing units. The distributed compute 144 system may process one or more components of the entity resolution component 130.

To efficiently spread computational resources to the various processing units of the distributed compute 144 system, a record partitioning component 146 may divide the various blocks created by the record blocking component 142 into similar sized partitions. The total memory size of the cluster may be determined based on the size of the maximum compute requirement of the entity resolution component 130. The number of partitions may be determined on the requirements of the task. For example, a record blocking component 142 of 150 million corporate records may be divided into 640 partitions that are spread among a 20 processor distributed compute 144 system. A record partitioning component 146 may greatly increase the number of partitions in the cluster in order to more quickly process the record alignment component 148.

A record alignment component 148 may process the blocks created by the record blocking component 142 on the partitions that were created by the record partitioning component 146 to resolve entities. Various methods may be used to resolve entities.

In an exemplary embodiment, a machine learning algorithm is used to resolve the entities. In one example, a Generative Bayesian Model, a Naïve Bayes classifier, is used to process blocks of records. A Naïve Bayes classifier is a probability model that assigns a probability to various features. A probability that a data record belongs to a class is determined by applying Bayes' theorem to the probabilities.

In another example, a support vector machine ("SVM") learning algorithm is used to resolve entities. The SVM algorithm represents data records as points in space. The area of space for various classes of data are determined based on clustering of the data records. The class of new data records are then determined based on their positions in space.

In another example, a decision tree is used to resolve entities. A decision tree comprises nodes that branch into two nodes based on a condition. Each node may have a different condition. The nodes may successively branch with conditions that are fit to a class. A decision tree may operate on a data record by starting at an input node and traveling down the branches based on conditions of the data record at each node. The class of the data record may be dependent on the final node on which the data record is operated.

In another example, gradient boosted trees are used to resolve entities. A gradient boosted tree processes many decision trees in a series. Each successive decision tree in the series is trained based on the errors of the previous tree. The trees in the series are weighted to return the best overall results.

In one example, a random forest learning algorithm is used to process the blocks of records. A random forest algorithm uses decision trees to classify data. Multiple decision trees may be devised as the algorithm is built, with a goal that the multiple decision trees are not correlated. In the decision trees of the ideal random forest, the strengths and weaknesses of the individual decision trees are not shared with other decision trees. The random forest algorithm may classify entities by a consensus of individual decision trees.

In another example, a K near neighbors ("KNN") machine learning algorithm is used to process blocks of data records. A KNN algorithm operates on data records with a similarity function. The Data records are classified based on their similarity values. Data records with similarity values that are close to one another receive the same classification.

In another example, a neural network machine learning algorithm is used to classify data records. The neural network is organized into layers of nodes. Input values are entered into a layer of input nodes. The input nodes are each connected to nodes in one or more layers of nodes by synapses. Each synapse has a value associated with it and each node in the hidden layer has a value. Input values are operated on based on the values of the synapses and the values of the nodes. The final layer of nodes is the output layer. The value of the output layer determines the classification of the data record.

Once the entities are resolved by the record alignment component 148, the entities may be assigned as vertices in a knowledge graph. The vertices correspond to an entity and may be linked to records that were determined to be associated with the entity. Through this process, the entity resolution has also implicitly created some edges to different entities that also may live upon the same record. However, it is not always possible to take advantage of the entity resolution process, in order to create edges, such as in the case of one database having extremely limited information on a type of entity. To determine what connections, if any, there are between vertices for such a case, an additional edge resolution component 132 is used to analyze records of the entities. The edge resolution component 132 may include an entity pair aggregation component 150, an entity pair blocking component 152, an entity pair partitioning component 156 and an entity pair alignment component 158. The various components of the edge resolution component 132 may be processed by a distributed compute 154 system.

The entity pair aggregation component 150 may collect the entities to be analyzed from a database or from the entity resolution component 130. The collected entities may each be associated with multiple records. As the goal of the edge resolution component 132 is to determine connections between the entities, pairs of records of the entities are analyzed to determine if the records of one entity refer to another entity. If there is a possible edge for every combination of one type of entity with another type of entity, the total number of possible combinations can be high. For example, where there are N number of property entities and M number of company entities, there are N×M possible combinations of an edge between the property and company entities. The entity pair blocking component 152 may be used to reduce the number of pairs to be analyzed.

The entity pair blocking component 152 may reduce the possible number of pairs by implementing an adaptive blocking algorithm, which may limit the possible pairings for each entity based on rules that are determined by the adaptive blocking algorithm. Various examples of rules may be to limit possible pairs by a geographic area or a zip code. Another example rule may be to limit possible pairs by company type. For instance, a rule may limit a transportation company to possible pairing with entities that could be associated with a transportation company such as retail business. In an exemplary embodiment, the blocking algorithm is run iteratively until the number of potential comparisons is greatly reduced, but all possible true pairs are still present. Once the entities are blocked by the entity pair blocking component 152, the blocked entities may be more thoroughly analyzed by the entity pair alignment component 158.

The entity pair alignment component 158 may process the blocked entities in a distributed compute 154 system to determine connections between entities within the various blocks. The total memory size of the cluster may be determined based on the size of the maximum compute requirement of the edge resolution component 132. Partitions within the distributed compute 154 system are limited, to accommodate large potential blocks. In various embodiments, the entity pair partitioning component 156 may increase the partition count, to more quickly be processed by the entity pair alignment component 158. Like the record alignment component 148, the entity pair alignment component 158 may implement a learning algorithm to determine connections between the entities. In an exemplary embodiment, a classifier machine learning algorithm is implemented to determine connections between entities within the blocks. Connections between the entities may be represented as edges between vertices on the knowledge graph. The classifier machine learning algorithm may output a confidence score for each edge, which may be attached to the edge. The attributes for an entity may be ranked according to a confidence score of an edge that connects to the attribute. In one example, the confidence score of edges that are connected to an entity may be used to rank the attributes of the entity.

Once the vertices and edges of the knowledge graph are in place, the knowledge graph may be utilized by a client device 115. In various embodiments, the client device is a computer system with a display. In an exemplary embodiment, the processing server 110 may display vertices of property entities of the knowledge graph as points on a map that correspond to the addresses of the properties.

The client device 115 may include an entity selection component 162, an entity display component 164, and an entity record component 166. A client may utilize the entity selection component 162 to select entities of the knowledge graph. The entity selection component 162 may accept input from the client device such as keystroke, mouse, or textual input. Records associated with the selected entities may be displayed.

The entity display component 164 may display vertices on the client device 115 in various formats. For example, vertices may be displayed responsive to a user issuing a search request for an entity on the client device 115. In another example, the vertices may be displayed in a graphical format whereby the positions of vertices are determined by one or more records of the entities for which the vertices represent. In one implementation, the vertices of property entities are positioned on a map relative to their respective property addresses on the map.

The entity record component 166 may display records of selected entities. In various embodiments, the records may be organized based on the confidence score that was assigned by the record alignment component 148 for an entity, or the entity pair alignment component 158 for a connection. In an exemplary embodiment, the records may be prioritized based on a date associated with a record or a monetary value associated with the record. In an exemplary embodiment, the records may be prioritized based on the confidence score of the edge of the owning entity of the record. The records may be prioritized based on a combination of the confidence score and various other record parameters such as geographic proximity, company value, and family ties.

The resolution correction component 134 leverages the entities and edges that are resolved by the entity resolution component 130 and edge resolution component 132 to further resolve entities. The value of the graph lies in its ability to provide contextual information, not just for the product, but also for the improvement of the graph. By fetching the company entities or person entities that have been connected to a property entity, it is possible to identify duplicate company entities or person entities. By fetching the person entities that are connected to a company entity, it is possible to identify duplicate people. Each entity can therefore be used to identify duplicates or under-resolution in the other entities. It is therefore necessary to ensure that the entity resolution component 130, does not over-resolve entities. Over-resolution occurs when the entity resolution component 130 resolves two vertices that do not refer to the same entity into a single entity. Under resolution occurs when the entity resolution component 130 fails to combine two vertices that refer to the same entity.

A resolution correction component 134, following the entity resolution component 130 and edge resolution component 132, can therefore be utilized to remove under-resolution using the context of the graph described above. Methods to correct this under-resolution include the algorithms and machine learning models described previously for entity resolution, with different training data and different thresholds, so they behave more aggressively within the context of the graph. Additionally, graph-based classification and clustering models can be used, including graph convolutional networks or attributed network embeddings used in conjunction with a Deep Learning model.

The graph convolutional network may be used to further resolve entities and edges of a knowledge graph. Graph convolutional networks operate similarly to convolutional neural networks whereby layers of the network further comprise learnable filters that limit a response of nodes to input from a restricted region of the previous layer. The input that propagates comprises a matrix that describes at least a portion of the knowledge graph. The graph convolutional network may be trained to resolve entities that were under-resolved by the entity resolution component 130.

In various embodiments, a client application program interface (client "API" 170) is used to deliver a knowledge graph to a client. In various embodiments, a client may interact with the knowledge graph through the client API 170. The client API 170 may provide one or more functions that, when executed, cause the processing server to transmit one or more features of the knowledge graph to the client device 115. For example, the client API 170 may provide a function to query company entities that are connected to a property. In another example, the client API 170 may provide a function to query the property entities in a geographic area.

Figure 2:
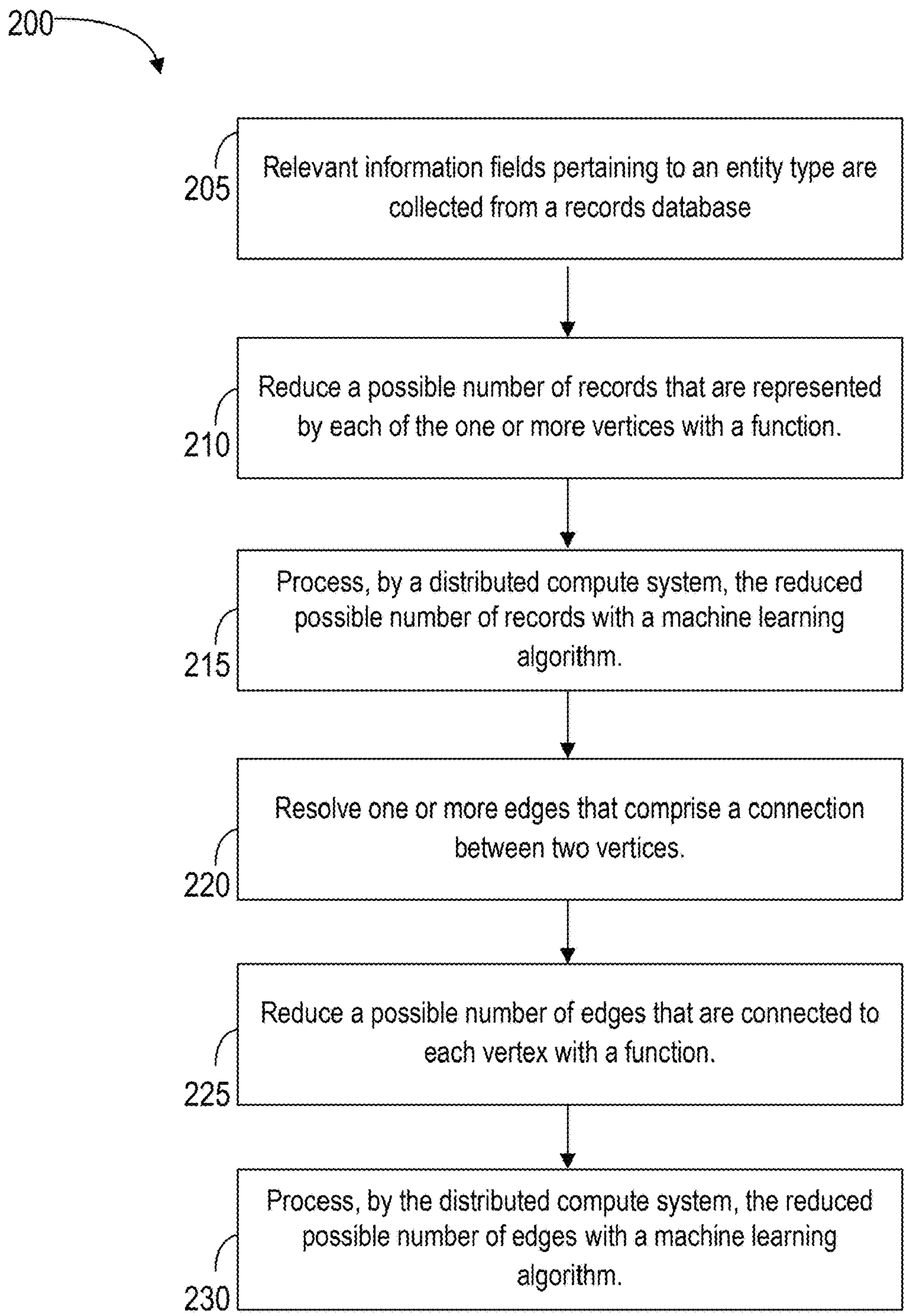
FIG. 2 is a flow diagram of a process for creating a knowledge graph.

Referring to FIG. 2, FIG. 2 is a flow diagram 200 of a method for creating a knowledge graph. The method may be utilized to produce a knowledge graph based on records from the multitude of databases 105. The method includes resolving vertices of entities on the knowledge graph and then resolving edges between the vertices. At step 205, relevant information fields pertaining to an entity type, are collected from records in databases 105. The relevant information fields are cleaned and formatted. These records then represent information that can potentially be resolved into a much smaller set of entities, by comparing the information on all records. The one or more vertices may be resolved with the entity resolution component 130. Step 205 may be performed on a distributed compute system in various embodiments.

The possible number of records for each entity is processed by a costly machine learning algorithm. To lower the computational cost of the machine learning algorithm at step 210, the process may reduce a possible number of records that are represented by each of the one or more vertices with a function. In various embodiments, an adaptive blocking function may be utilized to block groups of entities that can be grouped with one another. The adaptive blocking function may categorize entities based on rules and block groups of entities based on the rules. The rules for the adaptive blocking function may be determined by a machine learning function that is taught with training data. The adaptive blocking function may iterate over the possible groups of records until the number of potential comparisons is greatly reduced, but all possible true pairs are still present.

At step 215, the method may process, by a distributed compute system, the reduced possible number of records with a machine learning algorithm. In various embodiments, the multiple records may be partitioned such that multiple instances of a distributed compute system may process each partition in parallel. The machine learning algorithm delivers confidence scores which identify which information from each database records belongs to which entity. The information from multiple records, pertaining to each entity, is combined in various embodiments dependent on the type of the entity and the known quality of each database. By identifying records, belonging to an entity, which may have additional information identified to belong to another entity, implicit edges are created. Limited data, limited quality of data, and the structure of the records prohibit all necessary edges from being created by entity resolution so additional edge creation steps are needed.

At step 220, the method may resolve one or more edges that comprise a connection between two vertices. In an exemplary embodiment, the machine learned algorithm is based on a classifier algorithm. Determined connections may be attached to a confidence score, which may be used to prioritize connections. In an exemplary embodiment, connections may attach records that were used to determine the connections. Step 220 may be performed on a distributed compute system in various embodiments.

At step 225, the method may reduce a possible number of edges that are connected to each vertex with a function. Each vertex, in theory may possibly be connected by an edge to every other vertex. To lower the computation cost of evaluating every possible edge, the number of possible edges is reduced. In an exemplary embodiment, an adaptive blocking algorithm is employed to lower the possible number of edges for each vertex. In various embodiments. step 225 may be performed on a distributed compute system.

At step 230, the method may process, by the distributed compute system, the reduced possible number of edges with a machine learning algorithm. The machine learning algorithm may be a classifier type machine learning algorithm. In an exemplary embodiment, a compute cluster may be used to employ the machine learning algorithm to process the possible edges and determine actual edges. An example of actual edges may be visualized as the connection between vertices in FIG. 3.

Figure 3A:
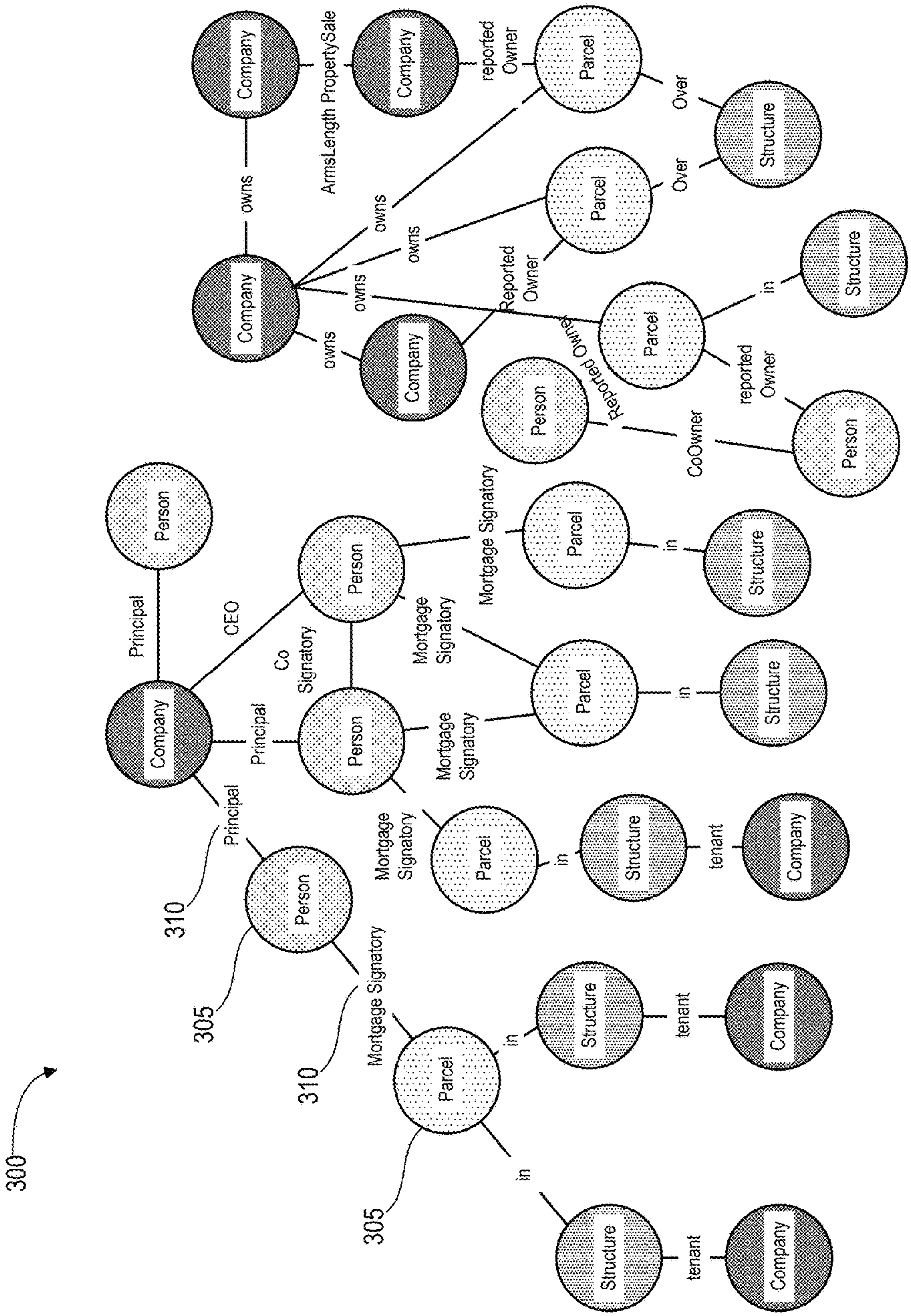
FIG. 3A is an illustration of vertices and connections that are displayed on a knowledge graph.

Referring to FIG. 3A, FIG. 3A is an illustration 300 of vertices 305 and connections 310 that are displayed on a knowledge graph. The illustration 300 is a graphical representation of the knowledge graph, which may be presented in various formats including the graphical representation shown in FIG. 3A. The knowledge graph may comprise entities that are connected to other entities which are related to the other entities through data in records.

Entities in the knowledge graph may be linked to records that were resolved to the entities by the entity resolution component 130. Resolved entities may be placed on the knowledge graph at a position that is determined by one or more the linked records. The placement of entities on the knowledge graph may also be determined, in whole or partially, by connected entities. Entities may also have confidence scores that are determined by a machine learning algorithm. The confidence score may determine placement, opaqueness, or size of the vertex that represents each entity.

The connections between the entities may be determined by the edge resolution component 132. As shown in FIG. 3A, each connection 310 may include a description of the most relevant record that established the connection 310. In various embodiments, the connections 310 may have a confidence score that was determined by a machine learning algorithm. Confidence scores of connections may be used to prioritize connected entities of vertices 305 that are selected on the knowledge graph.

Figure 3B:
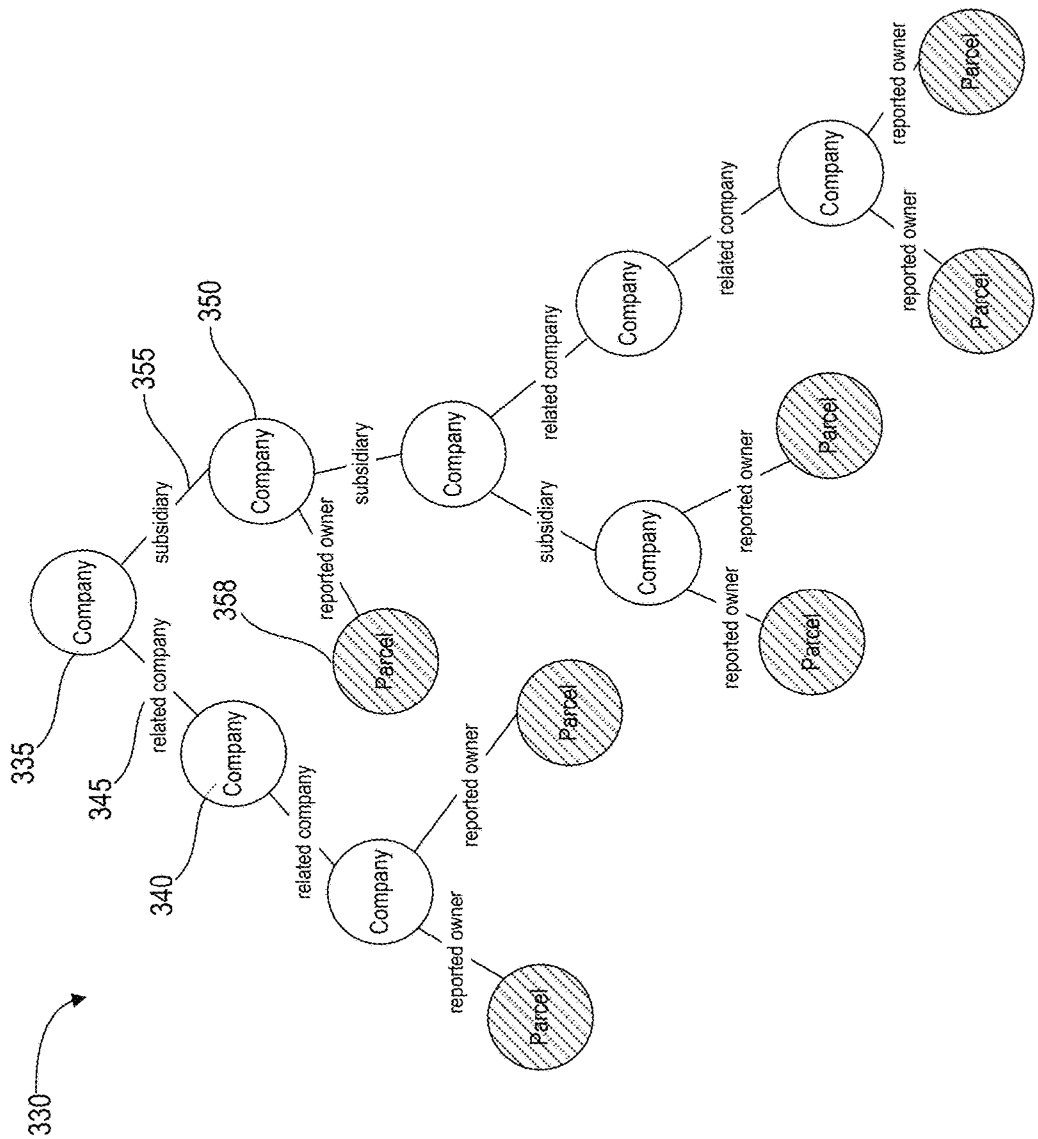
FIG. 3B is an illustration of vertices and connections that are displayed on a knowledge graph.

Referring to FIG. 3B, FIG. 3B is another illustration 330 of vertices and connections that are displayed on a knowledge graph. The various vertices of the knowledge graph in the illustration 330 are represented as companies and parcels. Edges represent the relationship between the various vertices. For example, company 350 is a reported owner of parcel 358. Accordingly, the company that owns of parcel of land may be determined by querying the parcel. Similarly, the various parcels of land that a company owns may be determined by querying the company.

Edges between companies may be resolved to determine a relationship between the companies. For instance, the edge 355 between company 335 and company 350 shows that one of company 350 or company 335 is a subsidiary of the other. In another example, the edge 345 that connects company 335 to company 340 show that company 335 and company 340 are related companies. A company and a related company may take direction from a common entity. Accordingly, one may determine controlling or related companies that own a property by querying the property. Likewise, the companies that have a stake in a property may be determined by querying the property.

Figure 3C:
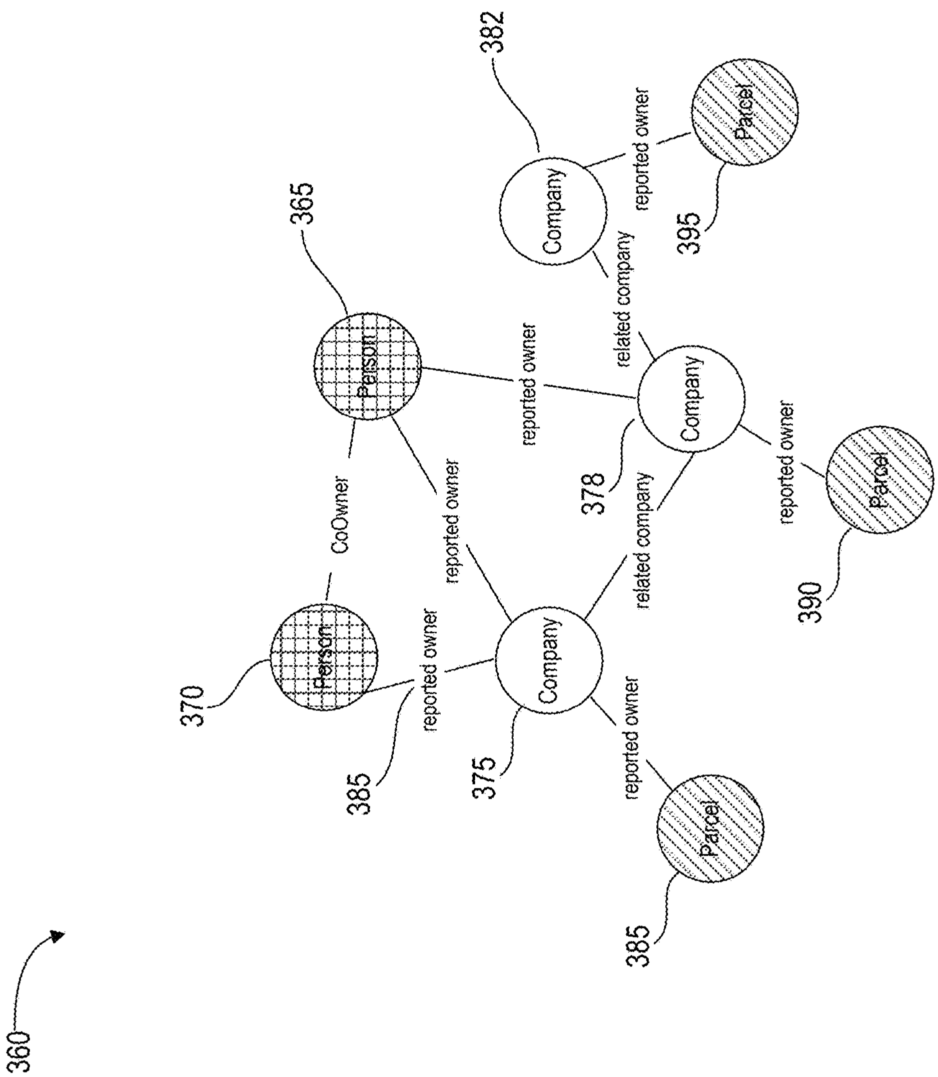
FIG. 3C is an illustration of vertices and connections that are displayed on a knowledge graph.

Referring to FIG. 3C, FIG. 3C is another illustration 360 of vertices and connections that are displayed on a knowledge graph. Like the illustration 330 in FIG. 3B, the illustration 360 in FIG. 3C presents how connections between resolved edges and vertices of the knowledge graph may be used to determine the stakeholders for parcels of land. For example, a query of parcel 385 may return that it is owned by company 375.

Further a query of company 375 may return that it is co-owned by person 370 and person 365. And further yet, the query of company 375 may return that it is related to company 378, which owns parcel 390 and that company 378 is related to company 382, which owns parcel 395. Thus, the query of parcel 385 may return that it shares a business interest with parcel 390 and parcel 395, which could lead to further insights.

Figure 4:
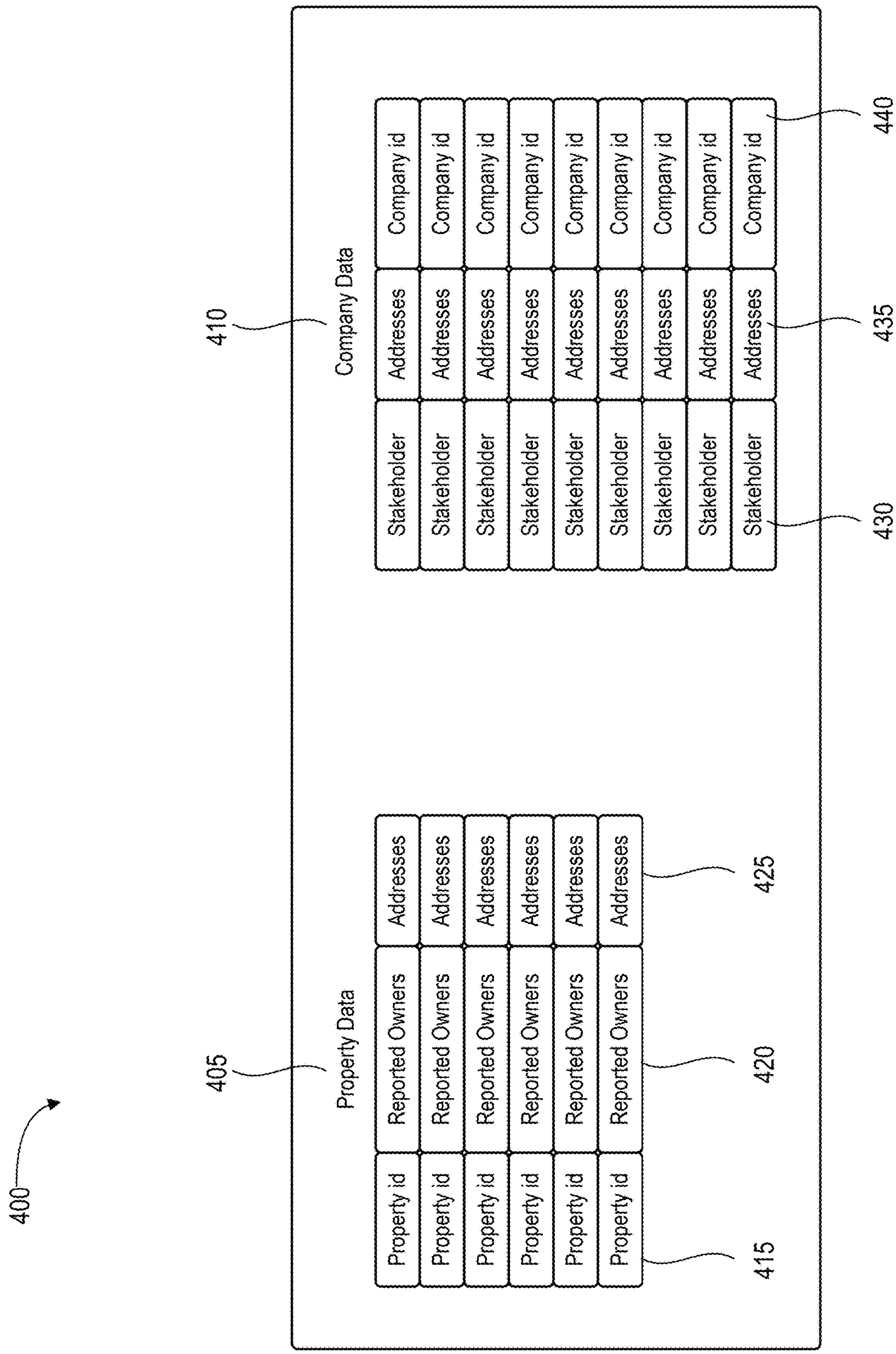
FIG. 4 is an illustration of data that may be stored in a database.

Referring to FIG. 4, FIG. 4 is an illustration 400 of data that may be stored in a database. The database may hold various types of data that refers to various types of entities. The database may be a part of a multitude of databases 105 that is processed by the processing server 110. As shown in FIG. 1, the multitude of databases 105 may contain any number of databases. For example, a property database 405 may contain property data and a company database 410 may contain data on corporate entities.

The various databases in the multitude of databases 105 may contain various types of data in various formats. Different types of data formats may refer to the same data and/or same entities. A goal of the entity resolution component 130 is to resolve entities based on data from various databases that refer to the entity. Similarly, the edge resolution component 132 may resolve connections between entities based on data in an entity the refers to another entity.

An example of a data type in a database is the property id 415 data field shown in the property database 405. The property id 415, reported owners 420, and addresses 425 data fields may each be completed for individual objects in the property database 405. An object may refer to an entity. Fields in the company database 410, shown in FIG. 4, include Stakeholder 430, Addresses 435, and company id 440. The entity resolution component 130 may resolve entities from objects represented by the fields in the databases. For example, each individual property id may refer to an individual entity. The entity resolution component 130 may determine whether multiple property id's 415 refer to the same entities. For example, the entity resolution component 130 may resolve two property id's 415 that have the same Addresses 425 into a single entity.

The entity resolution component 130 may link various fields of the property database 405 and company database 410. The edge resolution component 132 determines whether pairs of entities are associated in some way. For example, two separate property entities in the property database 405 may have a similar reported owners 420. Those entities may then be connected through different owners. Similarly, a Reported Owners 420 field of an object in the property database 405 may be the same as a Stakeholder 430 field in the company database 410. The edge resolution component 132 may determine that a property entity that was resolved from the property database 405 is connected to a business entity that was determined by the company database 410.

Figure 5:
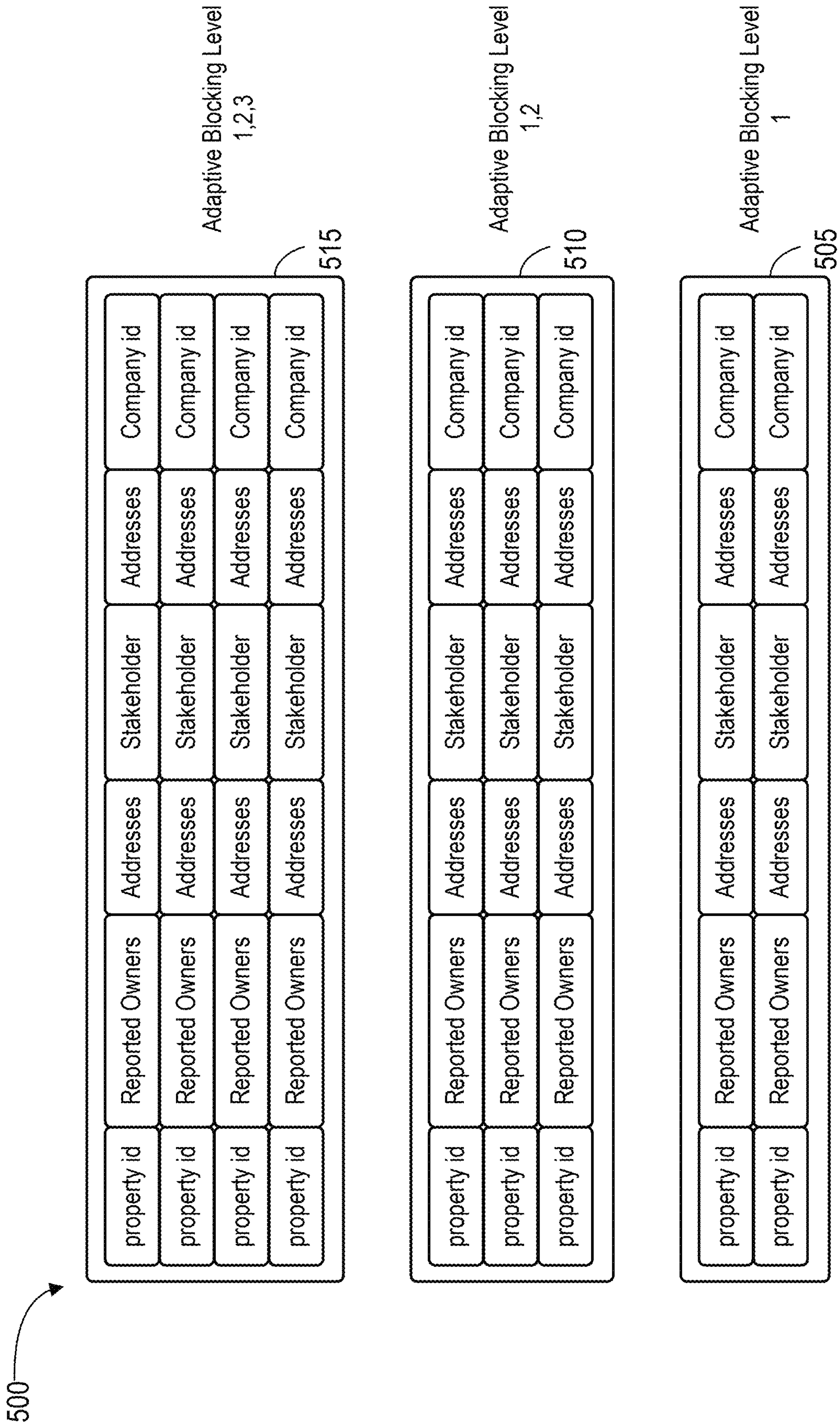
FIG. 5 is an illustration of data that is blocked by a function.

Referring to FIG. 5, FIG. 5 is an illustration 500 of data that is blocked by a function. A blocking function may place groups of data into blocks. The purpose of the blocking function is to organize groups that are likely to be connected into blocks and to exclude potential groups that have a low probability of being connected. The blocking function may operate based on rules for data fields. For example, properties in the same geographic state may be blocked together. In another example, Reported Owners with the same first initials of their first and last names may be blocked together.

In an exemplary embodiment, an adaptive blocking algorithm may be implemented to create blocks of data. The adaptive blocking algorithm may determine the rules to create blocks with a learned algorithm. Rules that determine groups of data may be implemented by the adaptive blocking algorithm to populate blocks until the blocks have a satisfactory amount of data. In an exemplary embodiment, the adaptive blocking algorithm may be implemented in iterations until the blocks have a sufficient amount of data.

As shown in FIG. 5, successive iterations of the adaptive blocking algorithm result in increasingly populated blocks. A first iteration 505 of the adaptive blocking algorithm may implement rules that determine the data objects that populate the block. In various embodiments, the adaptive blocking algorithm will continue iterating until a predetermined amount of data is populated in the blocks. A second iteration 510 may implement additional rules that have the effect of populating more data objects in the block. Similarly, a third iteration 515 may implement even more rules to further populate the block.

Figure 6:
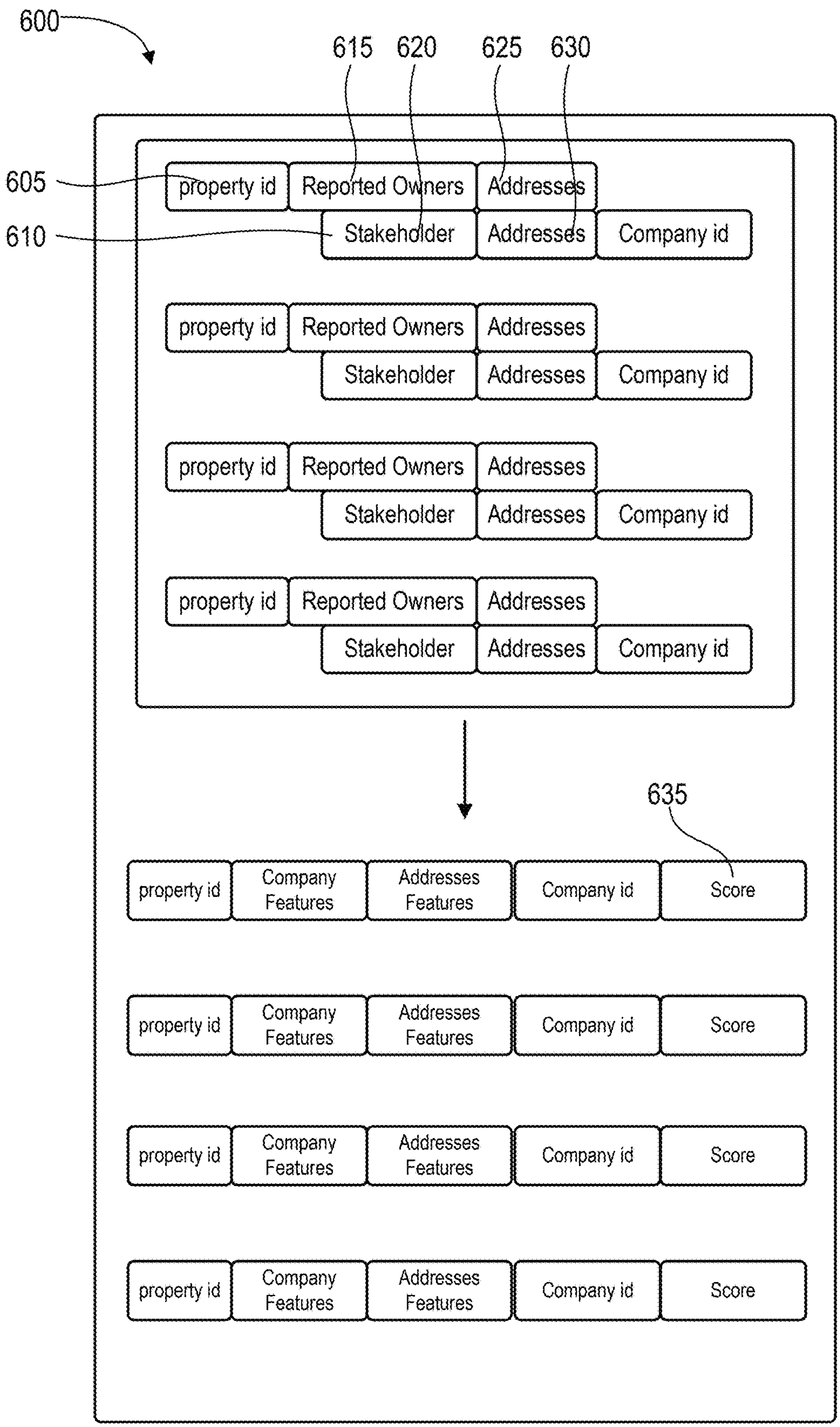
FIG. 6 is an illustration of a grouping of data that has been processed by an embodiment of the disclosed subject matter.

Referring to FIG. 6, FIG. 6 is an illustration 600 of a grouping of data that has been processed by an embodiment of the disclosed subject matter. Groups of data may be connected if they are determined to refer to the same entity. For example, a shareholder field of an object in a business database may refer to the same person entity as an owner field of an object in a property database.

The record blocking component 142 and entity pair blocking component 152 may implement an adaptive blocking function that determines likely groups of data fields that refer to the same data. The record blocking component 142 looks for data field groups that belong to the same entity while the entity pair blocking component 152 looks for data field pairs that belong to different entities that may be connected.

Once blocks, such as the those shown in FIG. 5 are created, the blocks may be analyzed to determine whether the data fields refer to the same data. The record alignment component 148 may analyze the block to determine where the data fields refer to the same entity. The entity pair alignment component 158 may analyze the data fields to determine if they refer to the same data of different entities.

As shown in FIG. 6, the data fields of a first data object 605 may be compared against one or more fields of a second data object 610. For example, the Reported Owners field 615 of the first data object 605 may be compared against the Stakeholder field 620 of the second data object 610. Similarly, the Addresses field 625 of the first data object 605 may be compared against the Addresses field 630 of the second data object 610. A score 635 may be assigned to each row. In various embodiments, the score 635 may be assigned by a machine learning algorithm that determine a level of confidence for each group of data. Groups with a low score 635 may be discarded from a block.

Figure 7:
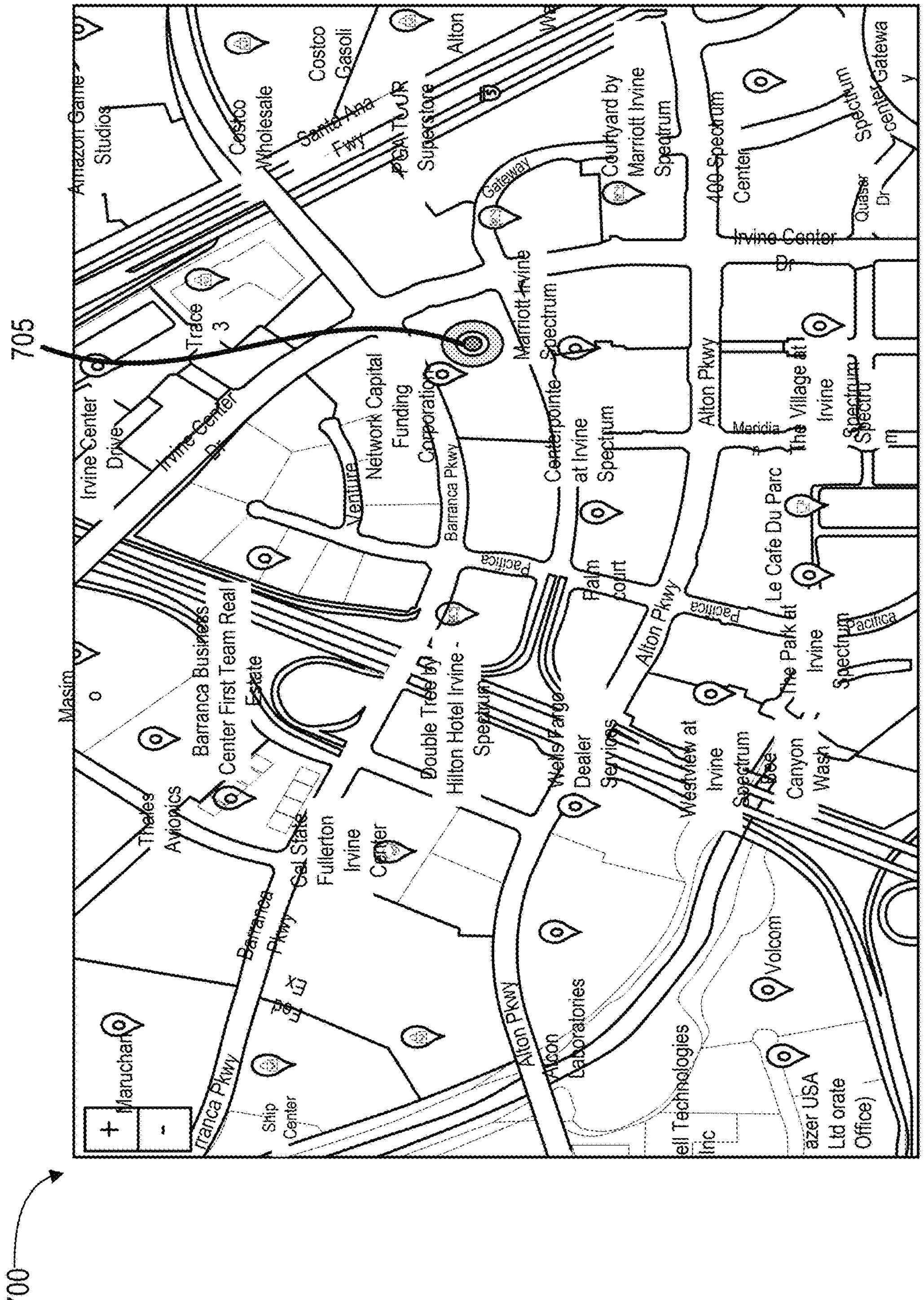
FIG. 7 is a screen shot of a property entity displayed on a map.

Referring to FIG. 7, FIG. 7 is a screen shot 700 of a property entity 705 displayed on a map. Property entities 705 are one of many types of entities that may be resolved by the entity resolution component 130. A property entity 705 may be placed at a position on a map that corresponds to at least one of the addresses of the property entity 705.

A property entity 705 may include all data fields that are associated with the property entity 705. For example, the property entity 705 may include an address data field, an owner data field, a monetary value data field, a lien data field, a jurisdiction data field, a mineral rights data field, a chemical waste data field, an easement data field, a covenant data field, and the like. The various data fields may provide valuable information for a user of a client device 115 that wishes to research a property. Additional properties may be researched by searching for an address or selecting an address of the additional property.

Figure 8:
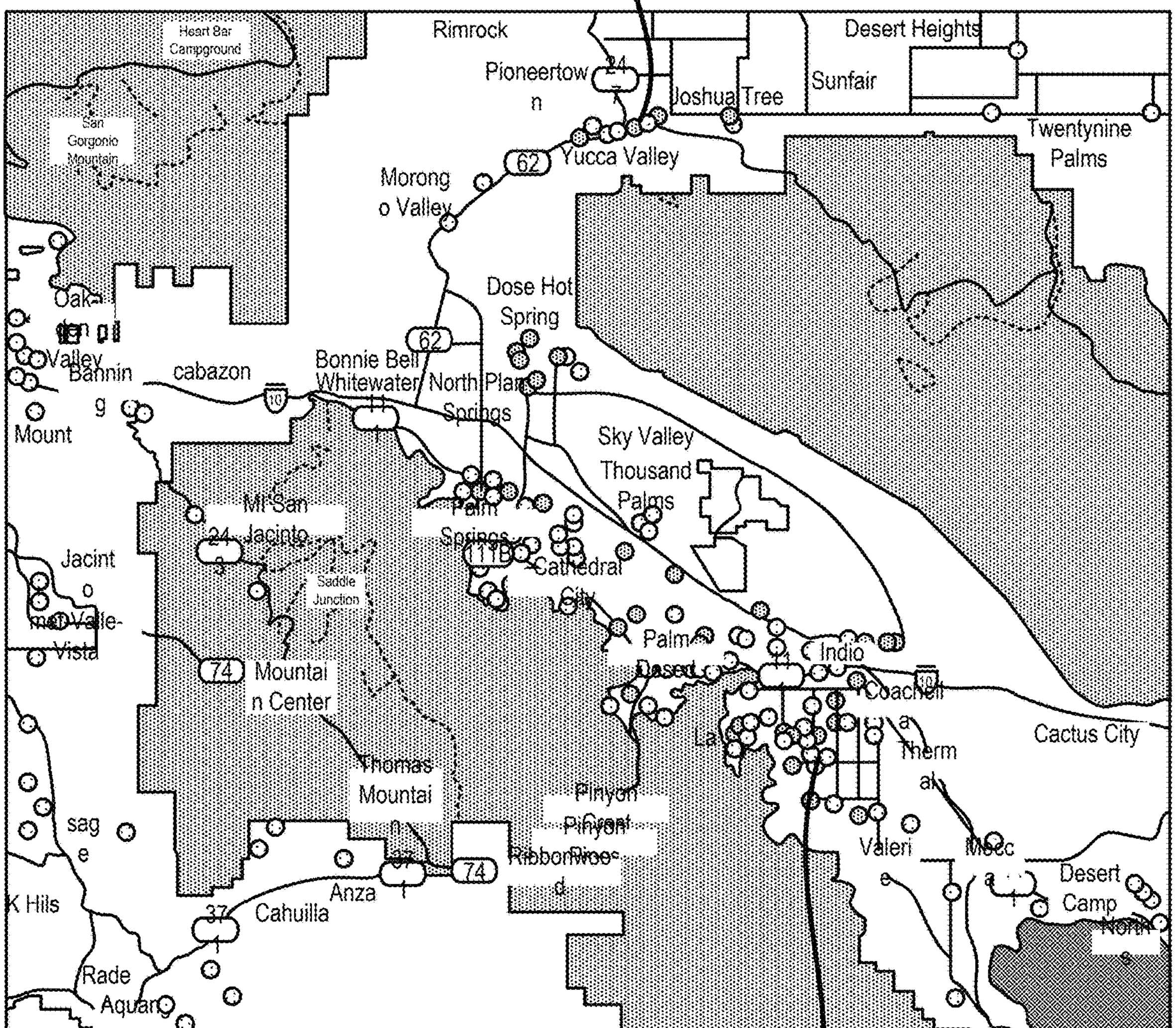
FIG. 8 is a screen shot of multiple property entities displayed on a map.

Referring to FIG. 8, FIG. 8 is a screen shot 800 of various property entities 805 displayed on a map. The various property entities 805 may each represent an individual vertex of the knowledge graph. The vertices of a knowledge graph may be displayed on a map such as the map shown on FIG. 8 whereby the placement of each vertex may correspond to the address field of an entity.

The various property entities 805 on the map may be resolved by the entity resolution component 130 based on data that is collected from a multitude of databases 105. In various embodiments, vertices of a knowledge graph may be presented in formats other than the map shown in FIG. 8. For example, entities may be listed in columns rather than presented on a graphical display. In another example, entities may be presented in a graphical display other than a map such as a hierarchical structure for corporate entities or a timeline that chronicles contractual agreements for all person entities in a multitude of databases 105.

In various embodiments, the various property entities 805 may be connected to other entities by the edge resolution component 132. Data fields of other entities that are connected to a property entity may be incorporated into the data fields of the property entity. Once incorporated, the data fields may be used to determine additional connections and elucidate additional information regarding the property entity. Thus, determining connections by the edge resolution component 132 may result in the determination of new insights and additional connections as data fields are incorporated into entities.

Figure 9A:
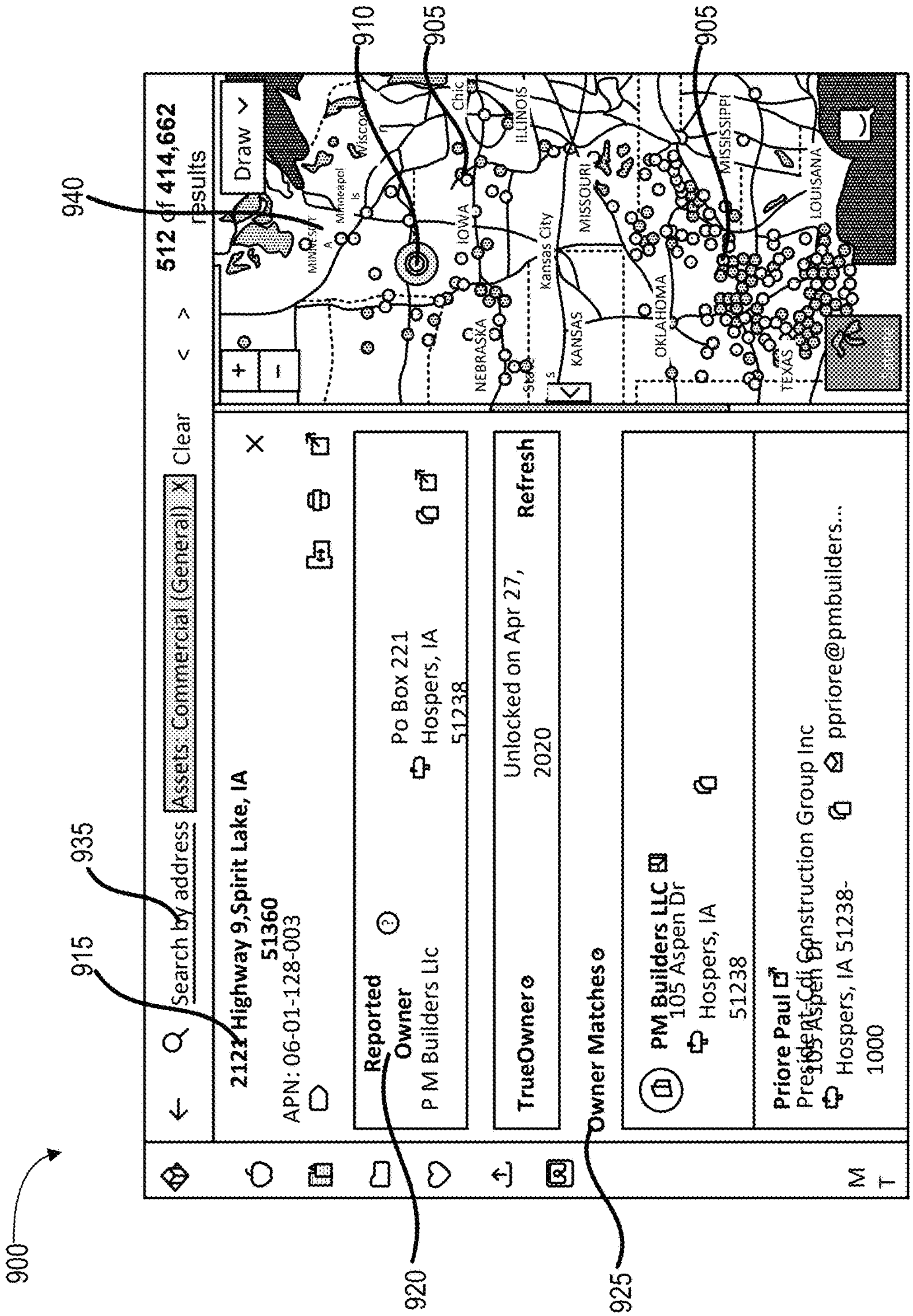
FIG. 9A is a screen shot of a selection of one of multiple property entities displayed on a map.

Referring to FIG. 9, FIG. 9 is a screen shot 900 of a selection of one of multiple property entities 905 displayed on a map 940. As shown in FIG. 9, the multiple property entities 905 may be displayed at locations on a map 940 that correspond to addresses of the multiple property entities 905. The processing server 110 may transmit data contained in the knowledge graph to a client device 115 in various formats and displays. For example, the property vertices of the knowledge graph may be transmitted to a client device 115 as vertices on a map at the address data field of the property entity data represented by the vertex. Each of the multiple property entities 905 may contain one or more data fields that were resolved from a multitude of databases 105 into the property entity.

In various embodiments, the multitude of property entities 905 may be displayed on a map 940 and can be scaled, translated, and rotated. A user may adjust the setting of the map 940 to perform research of a geographic area or perform research of an address. The multiple property entities 905 may be selectable by a user to display records that are associated with the selected property entity 910. As indicated by the outline around the selected property entity 910, its records are being queried by a user on a client device 115.

The processing server 110 may transmit the records of a selected property entity 910 responsive to a query by the client device 115. An entity name 915 may be displayed in an entity record section of the display of the client device 115. In the case of a property entity, the entity name may be the address data field of the property entity. The other data fields and connected entities of the selected property entity 910 may be listed under the entity name. For example, the Reported Owner 920 data field may be listed as the first record for property entities as it may be the most relevant data field for a property entity. The Owner Matches 925 data field may list other owners of the selected property entity 910 that are incorporated into the selected property entity's 910 data fields in the knowledge graph. The Owner Matches 925 may contain multiple owners, which may be listed according to the confidence score associated into the record by the entity resolution component 130 or edge resolution component 132. Alternatively, the owner matches 925 records may be listed in a chronological order or an order of relevance.

In addition to selecting the property entity on a map 940, a user may query an entity with other means such as inputting a search in the address box 935. Entities may be queried in other ways as well such as selecting a record of an entity that is connected to the selected property entity 910.

Figure 9B:
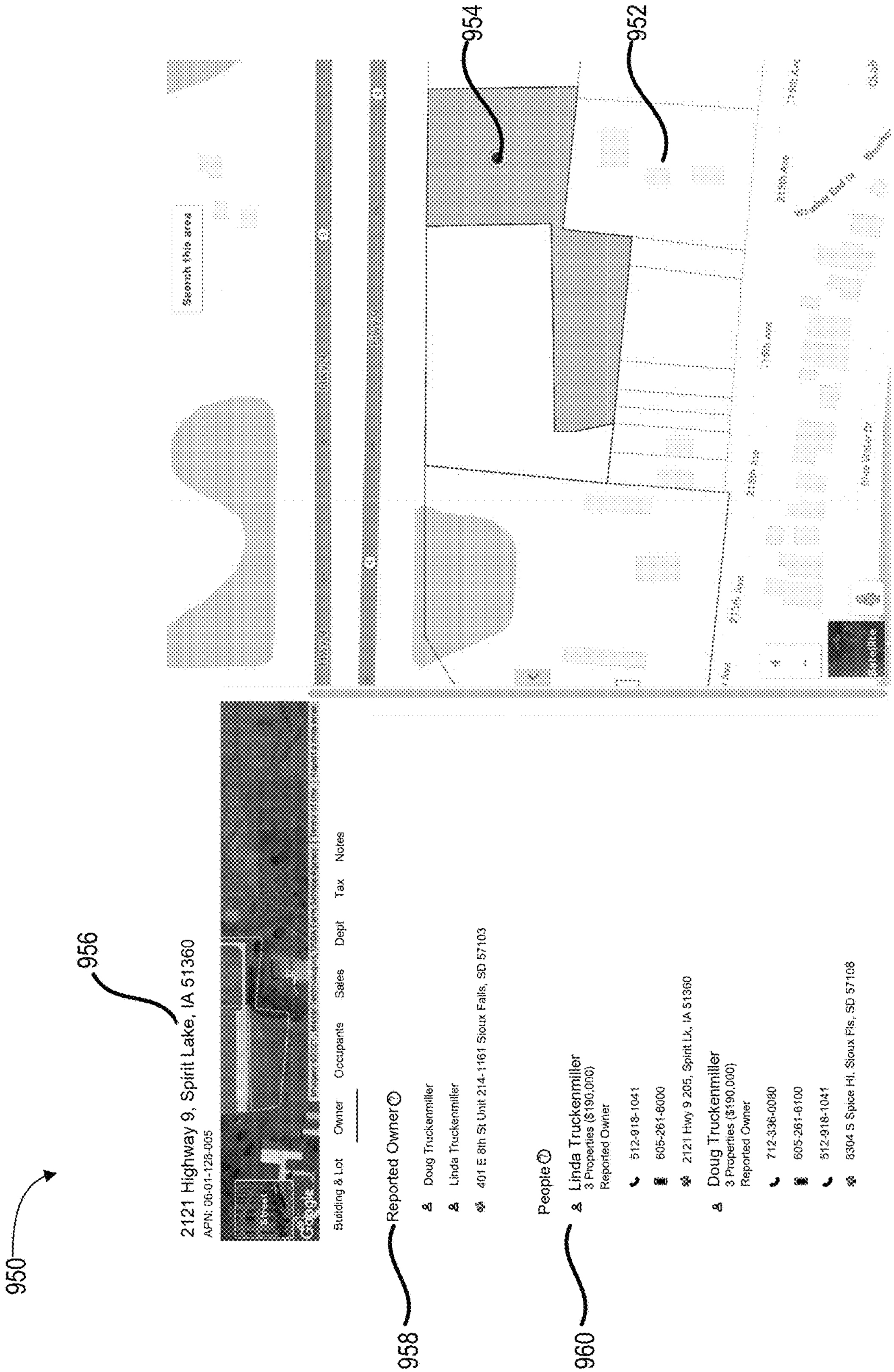
FIG. 9B is a screen shot of a selection of a property entity displayed on a map.

Referring to FIG. 9B, FIG. 9B is a screen shot 950 of a selection of a property entity 954 displayed on a map 952. The property entity 954 may be resolved by the entity resolution component 130 of the processing server 110. The edge resolution component 132 of the processing server 110 may resolve one or more connections to other resolved entities. The property entity 954 may be queried in multiple ways. For instance, the property address 956 may be entered into a search. Alternatively, the property entity may be queried by selecting the property entity 954 on the map 952.

In the screen shot 950 shown in the reported owner section 958 of FIG. 9B, the property entity 954 is connected to two person entities. Detailed information concerning the two person entities is expanded in the people section 960. The screen shot 950 shows that both of the person entities own 3 properties, have an address and a phone number. Accordingly, a further query of the person entities may reveal their other properties, which may lead to additional insights.

Figure 9C:
FIG. 9C is a screen shot of a selection of a property entity displayed on a map.

Referring to FIG. 9C, FIG. 9C is a screen shot 980 of a selection of a property entity 984 displayed on a map 982. The property entity 984 may be selected by browsing portions of a map 982. For instance, a query of properties on a city block could entail scrolling to the city block on the map 982 and selecting properties on the city block. As shown in the screen shot 980, the property entity 984 is selected. The boundary of the property entity 984 is shaded to present the perimeter of the property entity 984.

The embodiment displayed in the screen shot 980 shows a satellite view 995 of the property entity 984, which has an outline around its perimeter. The reported owner section 986 of the property entity 984 shows ownership connections to resolved entities. The ownership connections may be determined by the edge resolution component 132. Two companies are listed under the reported owner section 986, which shows that both companies have an interest in the property entity 984.

The companies section 988 lists resolved company entities that do business at the property entity 984. A selection of the company may reveal addition information about the property entity 984 or about the company. The people section 992 lists resolved person entities that are connected to the property entity 984 by the edge resolution component 132. Two person entities are displayed in the people section 992. Further information regarding the resolved connection of the person entities to the property entity 984 is listed under the person entities. For instance, one person entity is shown to have signed a mortgage for the property entity and the other person entity is shown to be a reported owner.

Figure 10:
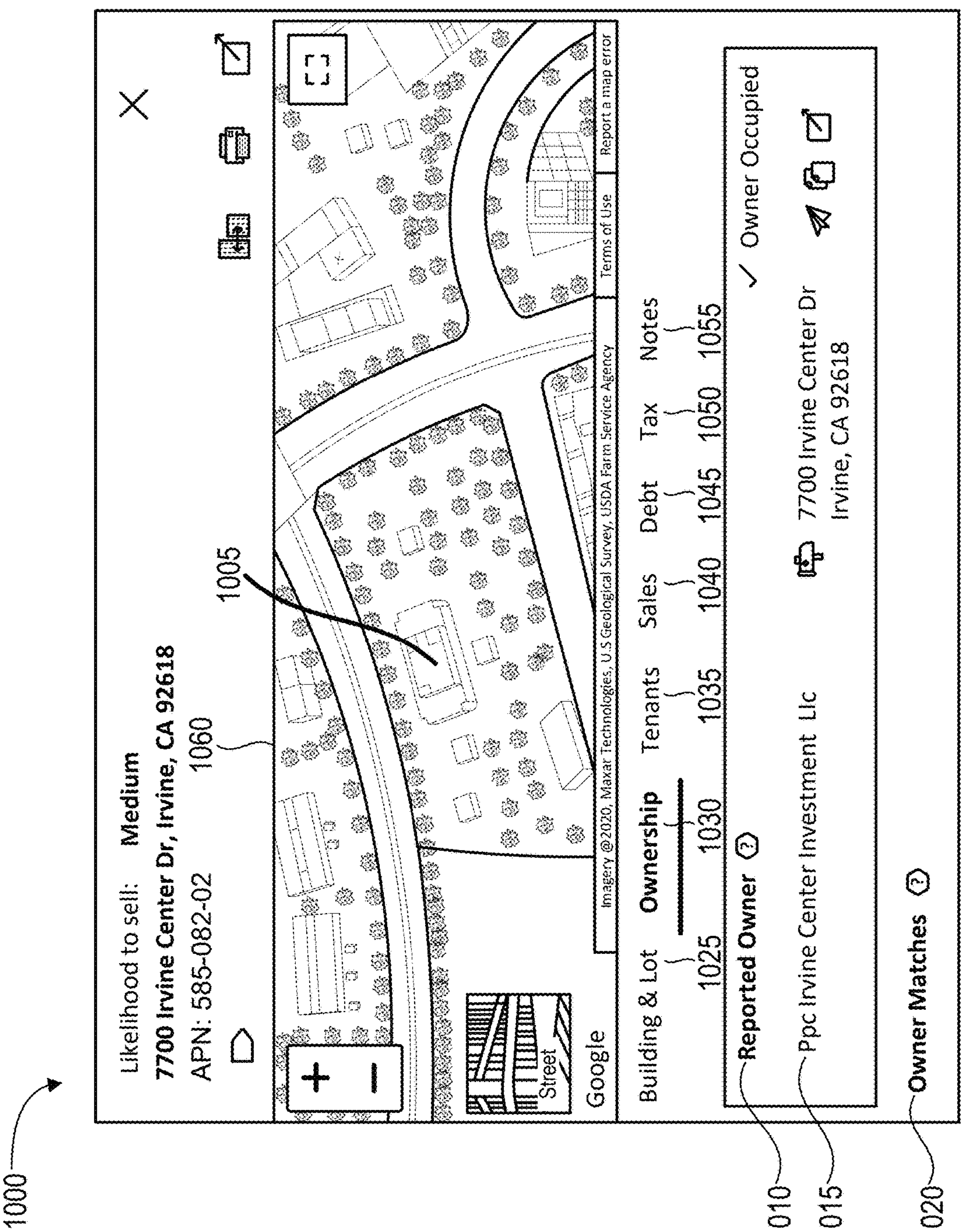
FIG. 10 is a screen shot of a selection of one of multiple property entities displayed on a map.

Referring to FIG. 10, FIG. 10 is a screen shot 1000 of a selection of one of multiple property entities displayed on a map. The processing server 110 may transmit data of the knowledge graph to the client device 115 in the form of text data, images, videos, documents, executable functions, or the like. As shown in FIG. 10, the client device 115 is displaying an image 1060 of a satellite view of the selected property entity 1005.

The records associated with the selected property entity 1005 may be displayed on the client device 115. In the example shown in FIG. 10, the records of the selected property entity 1005 may be organized into categories that are selectable by a user. As shown, the Ownership category 1030 is selected, which may instruct the processing server 110 to transmit data fields that are related to ownership of the selected property entity 1005 to the client device 115. The reported owner 1010 is displayed first as it is likely to be the most relevant ownership data and is listed as "Ppc Irvine Center Investment Llc" 1015. Other ownership records may be displayed as well. The owner matches field 1020 may list other owners that were resolved by the knowledge graph in a priority that corresponds to a confidence score of the ownership data or other method of prioritizing data.

Categories other than ownership may be selected by a user on the client device. The building & lot category 1025 may list the records associated with the building and/or the lot that houses the selected property entity 1005. Upon selection of the building & lot category 1025, the processing server 110 may transmit the records of the property entity for the building to the client device 115. The tenants category 1035, when selected, may list all the tenants of the selected property entity 1005. Alternatively, the tenants category 1035 may instruct the processing server 110 to transmit the records of all tenant entities of the building that houses the selected property entity 1005. The various tenant entities may be listed in various orders. Aside from alphabetical order, the list of tenant entities may be in order according to a confidence score that is associated with the tenant entities. The tenant entities may be listed according to various data fields such as gross income or number of employees. The Sales category 1040 may instruct the processing server 110 to transmit data records relating to sale or income of the selected property entity 1005. The Debt category 1045 may transmit records relating to debt of the selected property entity 1005. Debt records may include liens, mortgages, judgements, environmental damage, or other liabilities. The tax category 1050 may list records associated with taxes of the selected property entity 1005. And the notes category 1055 may accept information that is entered by a user of the client device 115. In an exemplary embodiment, information that is entered in the Notes category 1055 may be incorporated into the knowledge graph.

Figure 11:
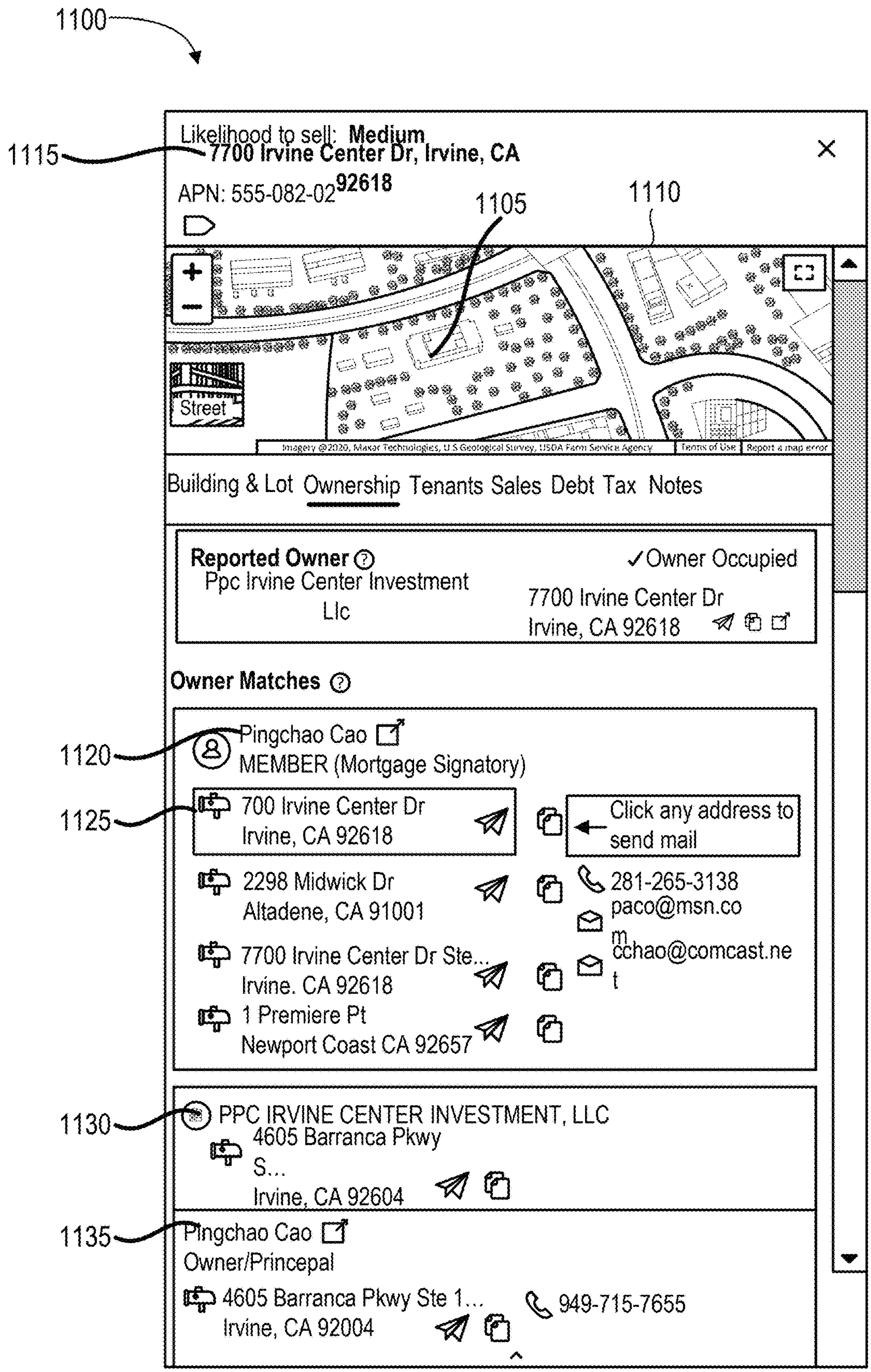
FIG. 11 is a screen shot of a priority list of entities associated with a selected property.

Referring to FIG. 11, FIG. 11 is a screen shot 1100 of a priority list 1125 of entities associated with a selected property entity 1105. Entities may be listed on the client device 115 in a priority that is determined by the processing server 110. As there may be many entities and records associated with a single entity, the prioritization of those entities may provide value to a user of the client device 115. For example, the list of entities may be prioritized according to the number of records that are associated with those entities in the knowledge graph, under the assumption that the entities with the most associated records are the most relevant.

As shown in FIG. 11, an image 1110 of the selected property entity 1105 may be transmitted to the client device 115 responsive to a query of the selected property entity 1105. The name 1115 of the selected property entity 1105 may be displayed above the other records and information associated with the selected property entity 1105. Various entities of person-type entity 1120 and company-type entity 1130, related to the selected property entity 1105, are listed under the image 1110 of the property and are ordered by the confidence score of the edges connected to the property entity 1105.

The person-type entity 1120 data field lists the current owner of the selected property entity 1105, which is displayed at "Pingchao Cao". As shown under the name "Pingchao Cao", the other property addresses 1125 associated with the owners are also listed. Each address may be linked to a separate property entity. The various property addresses may be prioritized according to the relevance of the property address. Here, the property address of the selected property entity 1105 is listed first. The other property addresses may be listed according to a confidence score of their respective property entities or other prioritization method.

Also listed is company-type entity 1130, which is associated with the selected property entity 1105. The company-type entity 1130, which is PPC IRVINE CENTER INVESTMENTS, has an address of a separate property entity. A selection of the company field may instruct the processing server 110 to transmit the records of the company and/or the property entity of the company. An Owner/Principal field 1135 of the company-type entity 1130 is listed under the company-type entity 1130.

Figure 12:
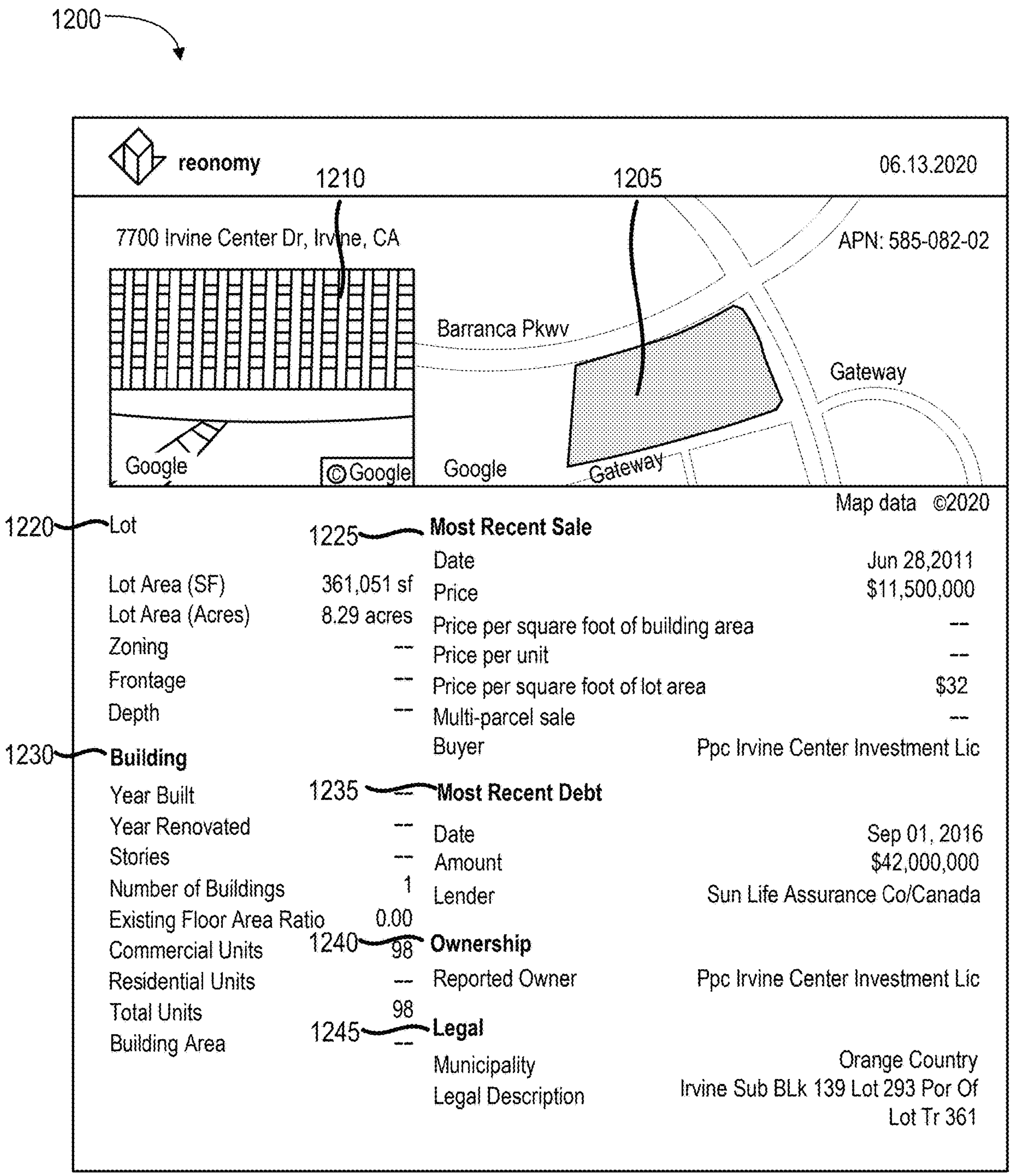
FIG. 12 is a screen shot of property details of a selected property.

Referring to FIG. 12, FIG. 12 is a screen shot 1200 of property details of a selected property. The processing server 110, upon request from the client device, may transmit various records associated with a selected entity 1205 to the client device 115. The various records may include records that were resolved by the entity resolution component 130 into the selected entity 1205. Additionally, the various records may include entities that were resolved by the edge resolution component 132 to connect to the selected entity 1205. The records of connected entities may be incorporated into the knowledge of the selected entity.

An image 1210 of the selected entity 1205 may be displayed. Other data including animations or executable code may be transmitted to the client device 115 by the processing server 110. As shown in FIG. 12, the various records may include Lot 1220, Most Recent Sale 1225, Building 1230, Most Recent Debt 1235, Ownership 1240, and Legal 1245. The Lot 1220 field may display records associated with the lot of the selected entity 1205. The lot may be a separate entity or be a record of the selected entity 1205. As shown, the lot includes area, zoning, frontage, and depth. The Most Recent Sale 1225 field may display records related to the last sale of the selected entity 1205, which may be the most relevant sale. The fields within the Most Recent Sale 1225 field include Date, Price, Price per unit area, and the Buyer.

The Building 1230 field may list the records associated with a description of the building of the selected entity 1205 such as the Year Built, Number of Buildings, Commercial Units, and Total Units. The Most Recent Debt 1235 may list the details of the of the last debt that was accepted by the selected entity 1205 including, but not limited to the date, amount, and lender of the debt. The Ownership 1240 field may list the current owner of the selected entity. A selection of the owner may instruct the processing server 110 to transmit the records of the owner entity to the client device 115. The Legal 1245 field may list relevant jurisdictional information such as the municipality that governs the selected entity 1205 and a legal description of the property of the selected entity 1205.

Figure 13:
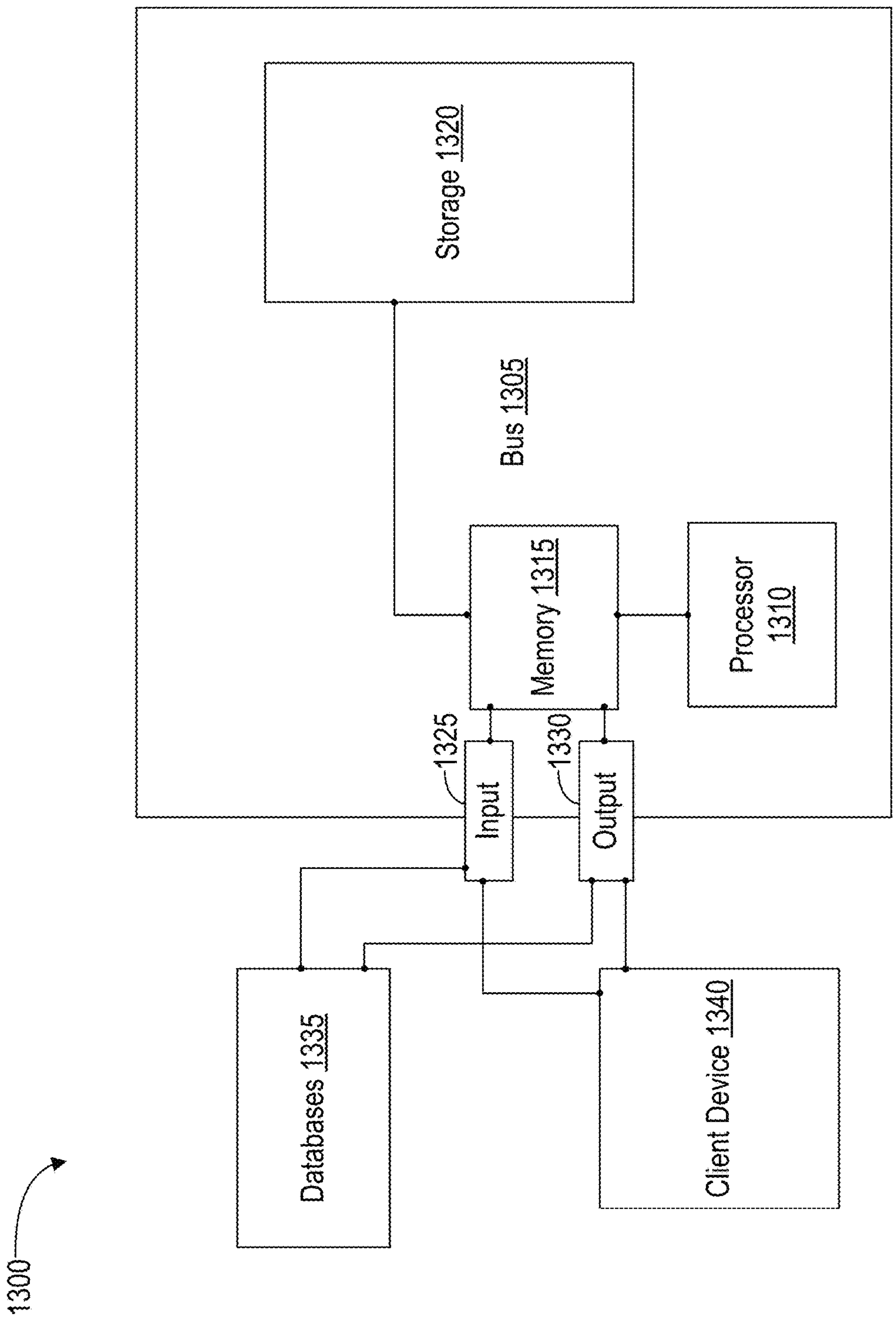
FIG. 13 is an illustration of a computer system that may perform the disclosed process of creating a knowledge graph.

Referring to FIG. 13, FIG. 13 is an illustration of a computer system 1300 that may perform the disclosed process of creating a knowledge graph. The computer system 1300 may be a single computer system, a co-located system, a cloud-based system, a distributed system, a compute cluster, or the like. The computer system 1300 may direct other computers in a distributed compute network to complete various processing tasks such as performing an analysis on various records.

A compute cluster may include one or more computing systems that are controlled by a single computer system 1300. In various embodiments, the compute cluster may direct parallel computations by the one or more computing systems. In one example, a compute cluster may resolve vertices or edges with a machine learning algorithm.

The various components of the computer system 1300 may be linked by a bus 1305 that connects them together. The bus 1305 may connect various components based on the requirements of the components. For instance the processor 1310 may be connected to the memory 1315 through a high speed bus 1305 connection. The processor 1310 executes instructions that are transmitted to the processor 1310 from the memory 1315. The processor 1310 may be a central processing unit (CPU), a graphics processing unit (GPU), a complex programmable logic device (CPLD), a field programmable gate array (FPGA), an application-specific integrated chip (ASIC), and the like. The instructions that are executed by the processor 1310 may be transmitted through the memory 1315 to various other components of the computer system 1300.

The memory 1315 transmits instructions to be executed to the processor 1310 and transmits executed instructions from the processor 1310 to the various components of the computer system 1300. Types of memory include random access memory (RAM) and read only memory (ROM). The memory 1315 may generally direct the operation of the computer system 1300 as most data will be transmitted through the memory 1315 on its way to other components of the computer system 1300. Data may be stored in a storage 1320 for long periods without losing the data if the computer system 1300 is powered down. Types of storage may include a spinning magnetic drive and flash storage.

Data and instructions from outside the computer system 1300 may be transmitted to the memory 1315 through an input. For example, records from databases 1335 may be collected through connections that traverse to the memory 1315 through the input 1325. In another example, a query from a client device 1340 may be directed to the memory 1315 through the input. Once the processor 1310 executes instructions contained within the query, data may be transmitted to the client device 1340 through an output 1330.

The invention claimed is:

1. A method for producing a knowledge graph, the method comprising:

collecting, from a plurality of databases at a processing server, a plurality of records;

identifying, using the processing server, a first format of a first portion of the plurality of records and a second format of a second portion of the plurality of records;

converting, using the processing server, the second portion of the plurality of records to the first format, wherein the first format is in a digital form;

resolving, using the processing server, a plurality of vertices from a plurality of record sources on a graph where each vertex of the plurality of vertices represents one or more records that contain information about an entity, wherein the resolving of the plurality of vertices comprises:

collecting a plurality of sets of data objects pertaining to an entity type from the plurality of record sources;

generating a block comprising a set of entities from the sets of data objects using a blocking function by:

populating a first sub-portion of the block by applying a first rule to the sets of data objects; and populating, in response to determining that the first sub-portion is below a threshold amount, a second sub-portion of the block by applying a second rule to the sets of data objects to obtain the set of entities;

reducing the set of entities in the block by:

determining, using the set of entities as an input to a first machine learning algorithm and using a distributed compute system, a score for each entity of the set of entities; and removing, from the block, entities associated with a score below a score threshold to receive a final set of entities; and assigning each entity from the final set of entities as a vertex of the plurality of vertices; and resolving one or more edges that comprise a connection between two vertices of the plurality of vertices, wherein the resolving of the one or more edges comprises:

reducing a possible number of edges that are connected to each vertex; and processing, by the distributed compute system, the reduced possible number of edges with a second machine learning algorithm; and causing at least a portion of the knowledge graph to be displayed on a client device in response to a request received from the client device, wherein vertices of the portion of the knowledge graph are positioned on a map relative to their respective property addresses on the map.

2. The method of claim 1, wherein the entity type comprises at least one of: individuals, organizations, or property; and wherein the first machine learning algorithm is unique to the entity type.

3. The method of claim 2, wherein the first machine learning algorithm generates a score that represents a degree of confidence in a resolution of the vertex.

4. The method of claim 1, wherein each edge represents an edge type that is based on the vertices for which the edge is connected;

wherein the second machine learning algorithm is unique to the edge type; and wherein the second machine learning algorithm generates a score that represents a degree of confidence in a resolution of the edge.

5. The method of claim 1, further comprising identifying duplicate vertices based on resolved vertices and resolved edges.

6. A computing system for producing a knowledge graph, the computing system comprising:

a processing server configured to:

collect, from a plurality of record sources, a plurality of records;

identify a first format of a first portion of the plurality of records and a second format of a second portion of the plurality of records;

convert the second portion of the plurality of records to the first format, wherein the first format is in a digital form;

resolve, with a vertex resolving method, a plurality of vertices from a plurality of record sources on a graph where each vertex of the plurality of vertices represents one or more records that contain information about an entity, the vertex resolving method comprising:

collecting a plurality of sets of data objects pertaining to an entity type from the plurality of record sources;

generating a block comprising a set of entities from the sets of data objects using a blocking function by:

populating a first sub-portion of the block by applying a first rule to the sets of data objects; and populating, in response to determining that the first sub-portion is below a threshold amount, a second sub-portion of the block by applying a second rule to the sets of data objects to obtain the set of entities;

reducing the set of entities in the block by:

determining, using the set of entities as an input to a first machine learning algorithm and using a distributed compute system, a score for each entity of the set of entities; and removing, from the block, entities associated with a score below a score threshold to receive a final set of entities; and assigning each entity from the final set of entities as a vertex of the plurality of vertices;

resolve, with an edge resolving method, one or more edges that comprise a connection between two vertices of the plurality of vertices, the edge resolving method comprising:

reducing a possible number of edges that are connected to each vertex with a function; and processing, by a distributed compute system, the reduced possible number of edges with a second machine learning algorithm; and cause at least a portion of the knowledge graph to be displayed on a client device in response to a request received from the client device, wherein vertices of the portion of the knowledge graph are positioned on a map relative to their respective property addresses on the map.

7. The computing system of claim 6, wherein the entity type comprises at least one of: individuals, organizations, or property; and wherein the first machine learning algorithm is unique to the entity type.

8. The computing system of claim 7, wherein the first machine learning algorithm generates a score that represents a degree of confidence in a resolution of the vertex.

9. The computing system of claim 6, wherein each edge represents an edge type that is based on the vertices for which the edge is connected;

wherein the second machine learning algorithm is unique to the edge type; and wherein the second machine learning algorithm generates a score that represents a degree of confidence in a resolution of the edge.

10. The computing system of claim 6, wherein the processing server is further configured to resolve, with a resolution correction method, vertices that were under-resolved by the vertex resolving method.

11. A method for producing a knowledge graph, the method comprising:

collecting, from a plurality of databases at a processing server, a plurality of records;

identifying a first format of a first portion of the plurality of records and a second format of a second portion of the plurality of records;

converting the second portion of the plurality of records to the first format, wherein the first format is in a digital form;

resolving a plurality of vertices from a plurality of record sources on a graph where each vertex of the plurality of vertices represents one or more records that contain information about an entity, wherein the resolving of the plurality of vertices comprises:

generating a block comprising a set of entities from a plurality of sets of data objects using a blocking function by:

populating a first sub-portion of the block by applying a first rule to the sets of data objects; and populating, in response to determining that the first sub-portion is below a threshold amount, a second sub-portion of the block by applying a second rule to the sets of data objects to obtain the set of entities;

reducing the set of entities in the block by:

determining, using the set of entities as an input to a first machine learning algorithm and using a distributed compute system, a score for each entity of the set of entities; and removing, from the block, entities associated with a score below a score threshold to receive a final set of entities;

assigning each entity from the final set of entities as a vertex of the plurality of vertices;

resolving one or more edges that comprise a connection between two vertices of the plurality of vertices, wherein the resolving of the one or more edges comprises:

reducing a possible number of edges that are connected to each vertex; and processing, by the distributed compute system, the reduced possible number of edges with a second machine learning algorithm; and causing at least a portion of the knowledge graph to be displayed on a client device in response to a request received from the client device, wherein vertices of the portion of the knowledge graph are positioned on a map relative to their respective property addresses on the map.

12. The method of claim 11, further comprising identifying duplicate vertices based on resolved vertices and resolved edges.

13. The method of claim 12, wherein each edge represents an edge type that is based on the vertices for which the edge is connected, and wherein the second machine learning algorithm is unique to the edge type.

* * * * *